US009522337B2

(12) United States Patent
Akifusa et al.

(10) Patent No.: US 9,522,337 B2
(45) Date of Patent: Dec. 20, 2016

(54) INFORMATION PROCESSING SYSTEM, INFORMATION PROCESSING APPARATUS, STORAGE MEDIUM HAVING INFORMATION PROCESSING PROGRAM STORED THEREON, AND DETERMINATION METHOD

(75) Inventors: Yusuke Akifusa, Kyoto (JP); Toshikazu Kiuchi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/598,906

(22) Filed: Aug. 30, 2012

(65) Prior Publication Data
US 2013/0249819 A1 Sep. 26, 2013

(30) Foreign Application Priority Data
Mar. 22, 2012 (JP) .................... 2012-065061

(51) Int. Cl.
G06F 3/01 (2006.01)
A63F 13/90 (2014.01)
A63F 13/2145 (2014.01)
A63F 13/235 (2014.01)
A63F 13/26 (2014.01)
A63F 13/428 (2014.01)

(52) U.S. Cl.
CPC ........... *A63F 13/90* (2014.09); *A63F 13/2145* (2014.09); *A63F 13/235* (2014.09); *A63F 13/26* (2014.09); *A63F 13/428* (2014.09); *G06F 3/01* (2013.01); *A63F 2300/105* (2013.01); *A63F 2300/1018* (2013.01); *A63F 2300/1075* (2013.01); *A63F 2300/301* (2013.01)

(58) Field of Classification Search
None
See application file for complete search history.

(56) References Cited

U.S. PATENT DOCUMENTS

| 6,396,480 B1 * | 5/2002 | Schindler et al. ............ 345/169 |
| 2005/0212767 A1 * | 9/2005 | Marvit et al. ................. 345/158 |
| 2007/0002016 A1 * | 1/2007 | Cho et al. ..................... 345/157 |

(Continued)

FOREIGN PATENT DOCUMENTS

| JP | 2010-136107 | 6/2010 |
| JP | 2012-009065 | 1/2012 |
| JP | 2012-050804 | 3/2012 |

OTHER PUBLICATIONS

Office Action dated Mar. 16, 2015 issued in U.S. Appl. No. 13/598,972, 13 pages.

(Continued)

*Primary Examiner* — Carolyn R Edwards
*Assistant Examiner* — Bipin Gyawali
(74) *Attorney, Agent, or Firm* — Nixon & Vanderhye P.C.

(57) ABSTRACT

An example controller device includes a housing, and a grip portion formed lopsided with respect to a center of a predetermined surface of the housing. An information processing system calculates an attitude of the controller device, and determines the orientation of the grip portion with respect to the center based on the attitude of the controller device. For example, the information processing system determines whether the grip portion is facing right or facing left with respect to the center. Thus, the information processing system can precisely determine the mode of use in which the controller device is used.

21 Claims, 20 Drawing Sheets

(56) References Cited

U.S. PATENT DOCUMENTS

| | | |
|---|---|---|
| 2008/0076565 A1 | 3/2008 | Okamura |
| 2010/0095773 A1 | 4/2010 | Shaw et al. |
| 2010/0113153 A1* | 5/2010 | Yen et al. ................. 463/37 |
| 2010/0141681 A1 | 6/2010 | Fujii |
| 2011/0190052 A1* | 8/2011 | Takeda et al. ............. 463/31 |
| 2012/0040759 A1 | 2/2012 | Ito et al. |
| 2012/0042476 A1* | 2/2012 | Karmatz ............. B25G 1/102 16/421 |
| 2012/0062386 A1* | 3/2012 | Badali ............... G06F 1/1626 340/635 |
| 2012/0092332 A1* | 4/2012 | Tsukahara et al. ......... 345/419 |
| 2012/0162514 A1* | 6/2012 | Ryu .................. G06F 1/1694 348/556 |

OTHER PUBLICATIONS

Feb. 24, 2014 Office Action in U.S. Appl. No. 13/598,972, 13 pages.
Notice of Allowance issued in U.S. Appl. No. 13/598,972 dated Dec. 18, 2015.

* cited by examiner (a) FRONT SIDE  (b) REVERSE SIDE (a) FRONT SIDE
(b) REVERSE SIDE (a) FRONT SIDE  (b) REVERSE SIDE

Fig. 7

| | | |
|---|---|---|
| ATTITUDE OF CONTROLLER DEVICE | ⬇ DOWNWARD DIRECTION | ⬇ DOWNWARD DIRECTION |
| ORIENTATION OF GRIP PORTION | DETERMINED TO BE FACING LEFT | DETERMINED TO BE FACING RIGHT |
| CONTENT OF PROCESS (EXECUTE PROCESS ASSUMING ARROW DIRECTION IS FORWARD DIRECTION) | | |

INFORMATION PROCESSING SYSTEM, INFORMATION PROCESSING APPARATUS, STORAGE MEDIUM HAVING INFORMATION PROCESSING PROGRAM STORED THEREON, AND DETERMINATION METHOD

CROSS REFERENCE TO RELATED APPLICATION

The disclosure of Japanese Patent Application No. 2012-65061 filed on Mar. 22, 2012 is incorporated herein by reference.

FIELD

The present specification discloses an information processing system in which an input is made by using a controller device that can be held by a user, an information processing apparatus, a storage medium having an information processing program stored thereon, and a determination method.

BACKGROUND AND SUMMARY

There are conventional information processing systems in which a user holds a controller device and inputs are made by using the controller device. For example, there is a technique which assumes a case where a user makes inputs on the touch panel of the controller device with the right hand and another case where a user makes inputs with the left hand, wherein the technique determines which is the case by prompting the user himself/herself to input whether the user is left-handed or right-handed.

Where the mode of holding is determined based only on an input made by the user himself/herself, the mode of holding may be erroneously determined due to an erroneous input.

Therefore, the present specification discloses an information processing system, an information processing apparatus, a storage medium having an information processing program stored thereon, and a determination method, with which it is possible to more precisely determine the mode in which the user is holding the controller device.

(1)

An example information processing system described in the present specification includes a controller device. The controller device includes: a housing; and a grip portion formed lopsided with respect to a center of a predetermined surface of the housing. The information processing system includes an attitude calculation unit and a determination unit. The attitude calculation unit calculates an attitude of the controller device. The determination unit determines an orientation of the grip portion with respect to the center based on the attitude of the controller device.

Where the grip portion is formed lopsided as in configuration (1) above, the orientation of the grip portion may differ depending on the user's preference in terms of the hand the user wishes to use or how the user wishes to hold the grip portion. With configuration (1) above, it is possible to determine the orientation of the grip portion of the controller device by calculating the attitude of the controller device. Therefore, the information processing system can precisely determine the mode of use in which the controller device is used.

(2)

The information processing system may further include a process executing unit for executing an information process after the determination by the determination unit, wherein the information process is an information process based on an input made on the controller device, and the content of the information process varies depending on a determination result of the determination unit.

With configuration (2) above, an information process is executed the content of which varies depending on the determination result of the determination unit. Therefore, the information processing system is capable of executing the information process of suitable content depending on the mode of use of the controller device. Thus, the user can freely select one way of holding the grip portion from among a plurality of ways with different orientations, and it is therefore possible to improve the controllability of a controller device 2.

(3)

The information processing system may further include an output unit for outputting, before the execution of the information process, an image and/or sound representing a mode of holding the controller device when the information process is executed.

With configuration (3) above, modes of holding (ways of holding) the controller device are presented to the user by an image and/or sound. Thus, it is possible to teach the user ways of holding the controller device in an easy-to-understand manner.

(4)

The information processing system may further include an output unit for outputting an image and/or sound representing a plurality of states with different orientations of the grip portion. Then, the determination unit selects an orientation of the grip portion from among the plurality of states (of the controller device).

With configuration (4) above, by presenting the image and/or sound to the user, the information processing system can show the user that there are a plurality of ways of holding the controller device to choose from, and specifically show the ways of holding. Therefore, the user can easily choose one of a plurality of possible ways of holding that the user prefers.

(5)

The output unit may output an image and/or sound representing the controller device as seen from a direction generally perpendicular to the predetermined plane.

With configuration (5) above, since an image and/or sound of the controller device as seen from a direction generally perpendicular to the predetermined plane on which the grip portion is provided is presented to the user, it is possible to present to the user ways of holding the controller device in an easy-to-understand manner.

Where configuration (5) above and configuration (10) below are combined together, by presenting the image and/or sound to the user, it is possible to guide the user to changing the attitude of the controller device to a state such that the attitude can be calculated based on the detection result of the acceleration sensor. That is, even when the attitude of the controller device is calculated by using the acceleration sensor, it is possible to easily make the determination.

(6)

The information processing system may further include a judgment unit for judging, where the image and/or sound is output, whether the controller device has assumed a predetermined attitude represented by the image and/or sound.

Then, the determination unit determines the orientation of the grip portion when the controller device has assumed the predetermined attitude.

With configuration (6) above, the information processing system determines the orientation of the grip portion when the controller device is actually held in the way of holding which has been presented by the image and/or sound. Thus, by making the determination at an appropriate time, it is possible to more accurately determine the orientation of the grip portion.

(7)

The controller device may further include a position detection unit for detecting a position at which an input has been made on a predetermined input surface provided on the housing. Then, the process executing unit executes the information process using at least the position detected by the position detection unit as an input.

With configuration (7) above, the user can operate the controller device using a touch input on the touch panel, thus enabling an intuitive and easy-to-understand operation. Where an operation is made by a touch input, the user holds the controller device by one hand, and it is therefore advantageous if configuration (2) above makes it easier to hold the controller device.

(8)

The process executing unit may execute the information process using at least the attitude of the controller device as an input.

With configuration (8) above, the user can perform an operation of changing the orientation (attitude) of the controller device, thus enabling an intuitive and easy-to-understand operation.

(9)

The grip portion may be formed lopsided with respect to a left-right direction of the predetermined plane. Then, the determination unit determines whether the grip portion is facing left or facing right with respect to the center. The process executing unit executes, as the information process, a process of changing a direction in a virtual space according to an attitude change of the controller device. The change in the direction in the virtual space is reversed depending on the determination result with respect to an attitude change about an axis extending in the left-right direction and/or an attitude change about an axis extending in an up-down direction parallel to the predetermined plane and perpendicular to the left-right direction.

Where it is determined whether the grip portion is facing left or facing right with respect to the center as in configuration (9) above, i.e., where there are two possible ways of holding that are opposite in terms of the up-down direction of the controller device, the orientation in which a direction in the virtual space changes in response to the attitude change of the controller device may vary depending on the way of holding. With configuration (9) above, since the orientation can be appropriately determined depending on the way of holding, the information processing system can properly execute a process in response to the operation of changing the attitude of the controller device.

(10)

The controller device may further include an acceleration sensor. Then, the attitude calculation unit calculates an attitude of the controller device with respect to a direction of gravity based on a detection result of the acceleration sensor.

With configuration (10) above, it is possible to easily calculate the attitude of the controller device by using the detection result of the acceleration sensor.

Note that the present specification discloses an example information processing apparatus including various units that are equivalent to the various units (excluding the grip portion) recited in configurations (1) to (10) above, and discloses an example non-transitory computer-readable storage medium storing an information processing program capable of causing a computer of an information processing apparatus to execute operations of the various units. The present specification also discloses an example orientation determination method (a method for determining the orientation of the grip portion) to be carried out in configurations (1) to (10) above.

With the information processing system, the information processing apparatus, the storage medium having an information processing program stored thereon and the determination method described above, the orientation of the grip portion formed lopsided with respect to the center of a predetermined surface of the housing of the controller device is determined based on the attitude of the controller device, whereby it is possible to precisely determine the mode of use in which the controller device is used.

These and other objects, features, aspects and advantages will become more apparent from the following detailed description when taken in conjunction with the accompanying drawings.

BRIEF DESCRIPTION OF THE DRAWINGS

FIG. 7 is a diagram showing an example orientation determination method according to the present embodiment;

DETAILED DESCRIPTION OF NON-LIMITING EXAMPLE EMBODIMENTS

1. Configuration of Information Processing System

Figure 1:
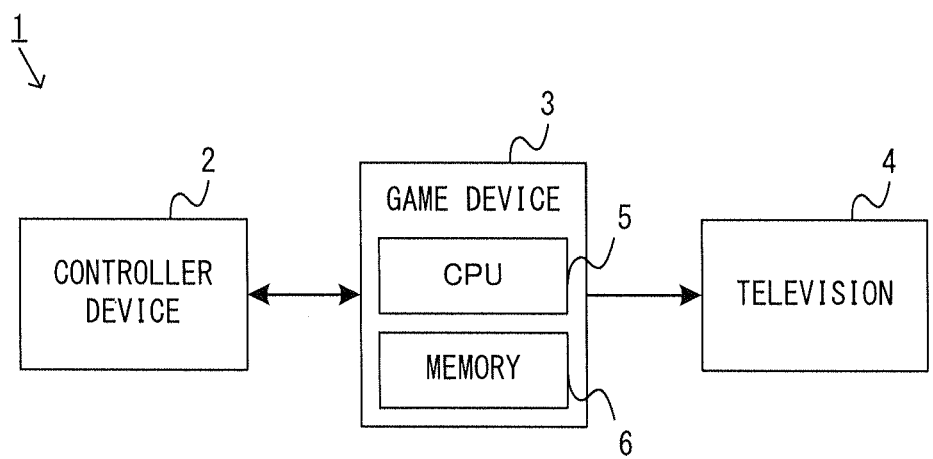
FIG. 1 is a block diagram showing an example non-limiting information processing system according to the present embodiment.

An information processing system, an information processing apparatus, an information processing program and a determination method according to an example of the present embodiment will now be described. FIG. 1 is a block diagram showing an example of an information processing system according to the present embodiment. In FIG. 1, an information processing system 1 includes a controller device 2, a game device 3, and a television 4. The information processing system 1 in the present embodiment is a game system for executing a game process in response to a game operation on the controller device 2.

In the information processing system 1, the game device 3 executes a predetermined information process (the game control process to be described below) in response to an input made on the controller device 2, and an image obtained as a result of the execution (the game image) is displayed on the controller device 2 and/or the television 4. Thus, in the present embodiment, the information processing system 1 has a configuration in which the input function, the information processing function and the display function are implemented by a plurality of devices. Note that in other embodiments, the information processing system 1 may be configured as a single information processing apparatus (e.g., a hand-held or portable information processing apparatus) having these functions.

The controller device 2 is an input device that can be held by a user. The controller device 2 is capable of communicating with the game device 3. The controller device 2 transmits operation data, which represents an operation made on the controller device 2, to the game device 3. In the present embodiment, the controller device 2 includes a display unit (an LCD 11). Where an image (game image) is transmitted from the game device 3, the controller device 2 displays the image on the display unit. The specific configuration of the controller device 2 will be described later (see FIGS. 2 and 3).

The game device 3 is an example of the information processing apparatus. In the present embodiment, the game device 3 includes a CPU (control unit) 5 and a memory 6, wherein the CPU 5 executes a predetermined information processing program using the memory 6, thereby implementing the various functions of the game device 3 (the game process shown in FIG. 19). The configuration of the game device 3 for executing the information process may be any configuration. The game device 3 executes the information process using the operation data from the controller device 2 as an input. Then, the game device 3 generates an image (game image) in accordance with the result of executing the information process. The generated image is output to the controller device 2 and/or the television 4, which are display devices.

The television 4 is an example of a display device for displaying the generated image. The television 4 can receive data transmitted from the game device 3. When the image generated in the game device 3 is transmitted to the television 4, the television 4 displays the image.

Figure 2:
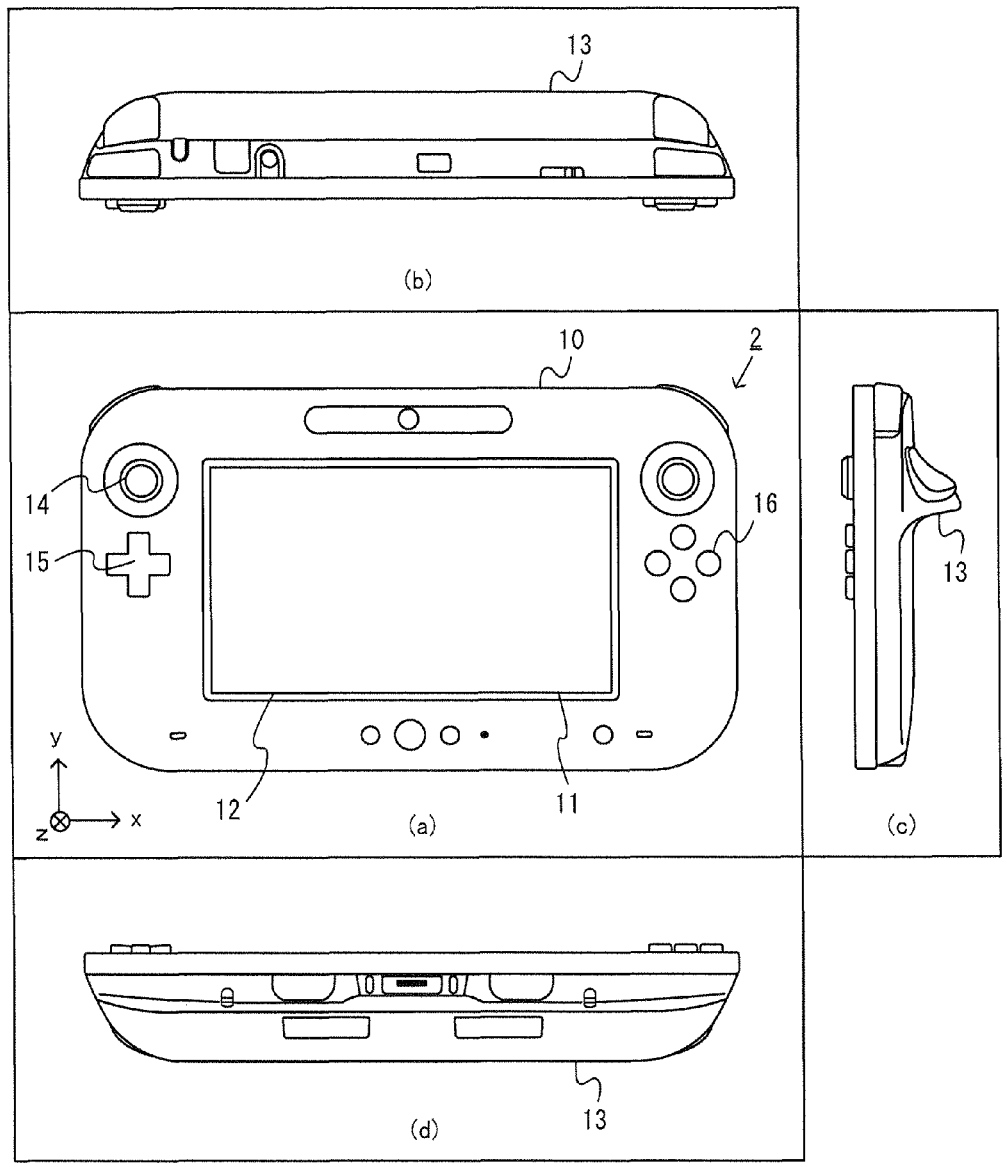
FIG. 2 is a diagram showing an external configuration of an example non-limiting controller device.

FIG. 2 is a diagram showing an example of an external configuration of the controller device 2. As shown in FIG. 2, the controller device 2 includes a generally plate-shaped housing 10. The housing 10 has such a size (shape) that it can be held by a user with both hands or one hand. The controller device 2 includes the LCD 11, which is an example of the display unit. The LCD 11 displays an image obtained as a result of the information process in the game device 3. The controller device 2 includes a touch panel 12. The touch panel 12 is an example of a position detection unit for detecting a position at which an input is made on a predetermined input surface (the screen of the display unit) provided on the housing 10. Moreover, the controller device 2 includes a slide pad 14, a cross-shaped key 15, a button 16, etc., as an operation unit (an operation unit 22 shown in FIG. 3).

As shown in FIG. 2(c), for example, the controller device 2 includes a grip portion 13. The grip portion 13 is provided on the reverse surface of the housing 10 so as to protrude at a position slightly above the center with respect to the up-down direction. Thus, the grip portion 13 is formed lopsided with respect to the center of a predetermined surface of the housing 10. The grip portion 13 may be arranged at a position lopsided with respect to the center of the controller device 2, or may be arranged at the center if it is lopsided from the center by diagonally protruding from the center, for example. In the present embodiment, the grip portion 13 has a shape protruding from the housing 10. The shape of the grip portion 13 such that fingers can lean against the grip portion 13 (e.g., fingers can rest thereon) may be any shape. In the present embodiment, the grip portion 13 is provided so as to extend in the left-right direction, which is the longitudinal direction of the housing 10. Therefore, where the controller device 2 is held in a portrait position, the user can easily hold the controller device 2 by resting fingers on the grip portion 13 (see FIG. 4, etc.).

Figure 3:
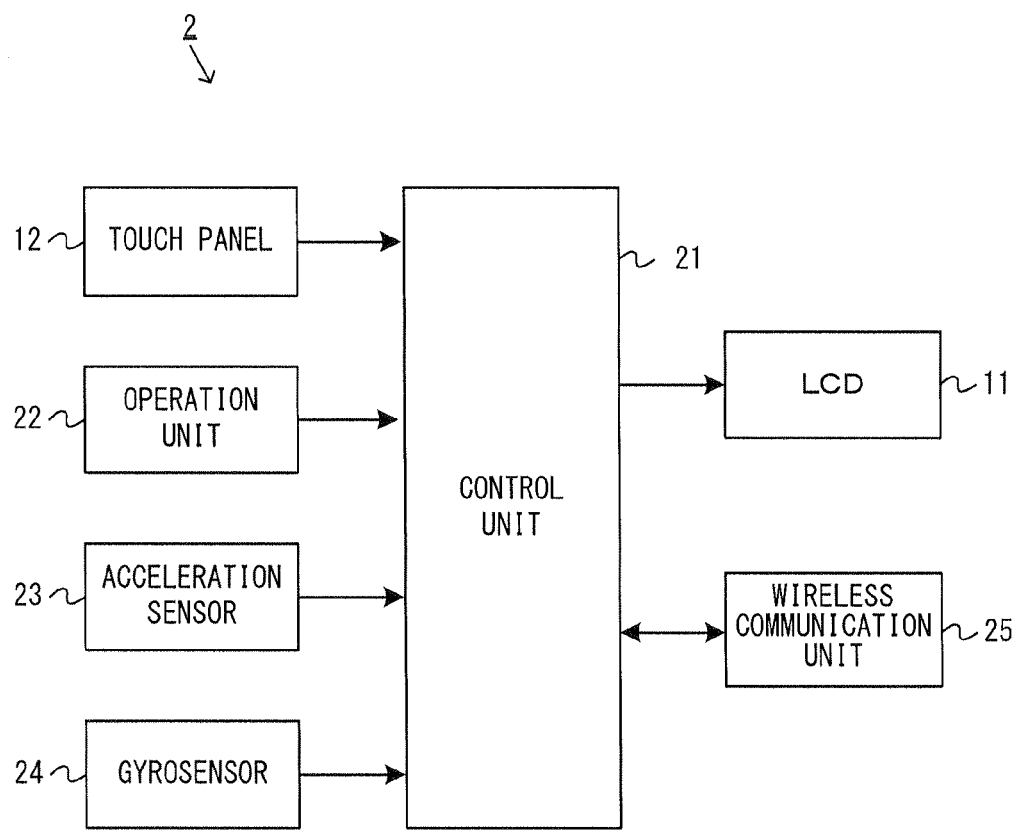
FIG. 3 is a block diagram showing an example electrical configuration of a controller device.

FIG. 3 is a block diagram showing an electrical configuration of the controller device 2. As shown in FIG. 3, the controller device 2 includes the following elements, in addition to the LCD 11, the touch panel 12 and the operation unit 22 described above.

As shown in FIG. 3, the controller device 2 includes an acceleration sensor 23. The acceleration sensor 23 detects the acceleration of the controller device 2 in a predetermined axis direction (while there are three axis directions in the present embodiment, there may be one or more axis). The controller device 2 also includes a gyrosensor 24. The gyrosensor 24 detects the angular velocity of the controller device 2 with respect to rotation about an axis extending in a predetermined axis direction (while there are three axis directions in the present embodiment, there may be one or more axis). The acceleration sensor 23 and the gyrosensor 24 are sensors for detecting information used for calculating the attitude of the controller device 2 (information with which the attitude can be calculated or estimated). Note that in other embodiments, a different sensor, such as a magnetic sensor (azimuthal sensor), may be used as the sensor for detecting information used for calculating the attitude.

As described above, while the sensor for calculating the attitude of the controller device 2 is provided in the controller device 2 in the present embodiment, the information processing system 1 may be configured so that the sensor is provided in a device other than the controller device 2. For example, a camera capable of capturing an image of the controller device 2 may be provided in the information processing system 1, and the attitude of the controller device 2 may be calculated based on the image captured by the camera.

The controller device 2 includes a wireless communication unit 25 capable of wirelessly communicating with the game device 3. Thus, while wireless communication is used between the controller device 2 and the game device 3 in the present embodiment, wired communication may be used in other embodiments.

The controller device 2 includes a control unit 21 for controlling operations in the controller device 2. Specifically, the control unit 21 receives output data from input units (the touch panel 12, the operation unit 22, the acceleration sensor 23, and the gyrosensor 24), and transmits the data as operation data to the game device 3 via the wireless communication unit 25. When image data from the game device 3 is received by the wireless communication unit 25, the control unit 21 executes an appropriate process as necessary (e.g., an expansion process where the image data has been compressed), and displays the image from the game device 3 on the LCD 11.

2. Process Determining Orientation of Grip Portion

Figure 4:
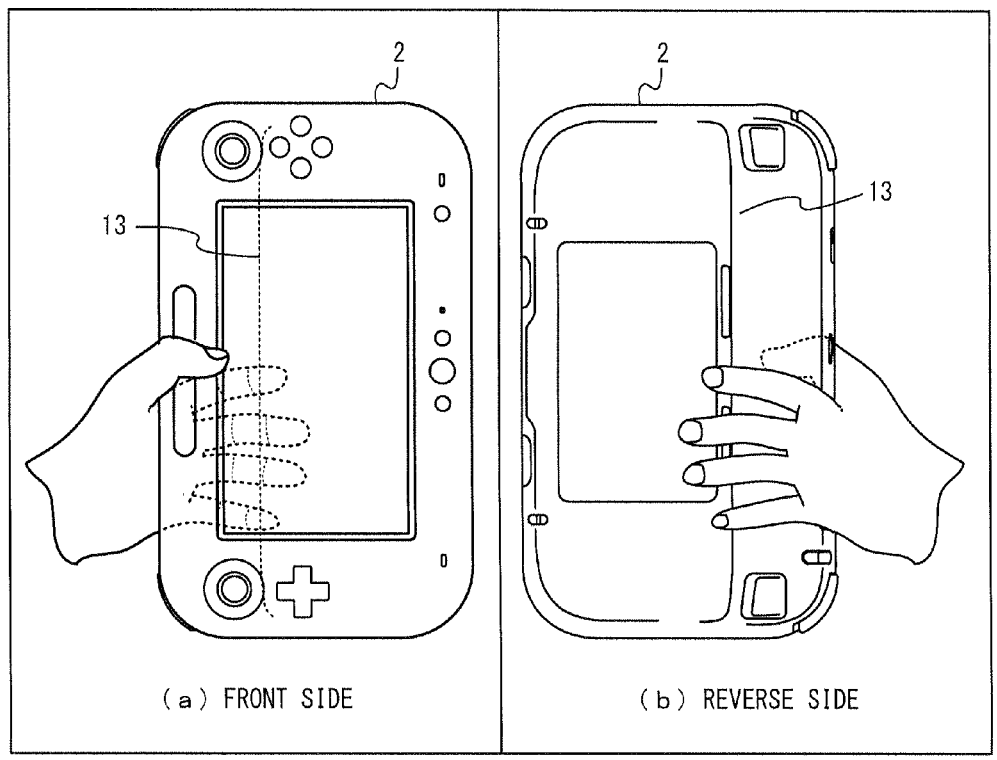
FIG. 4 is a diagram showing an example of how the controller device is held.
Figure 5:
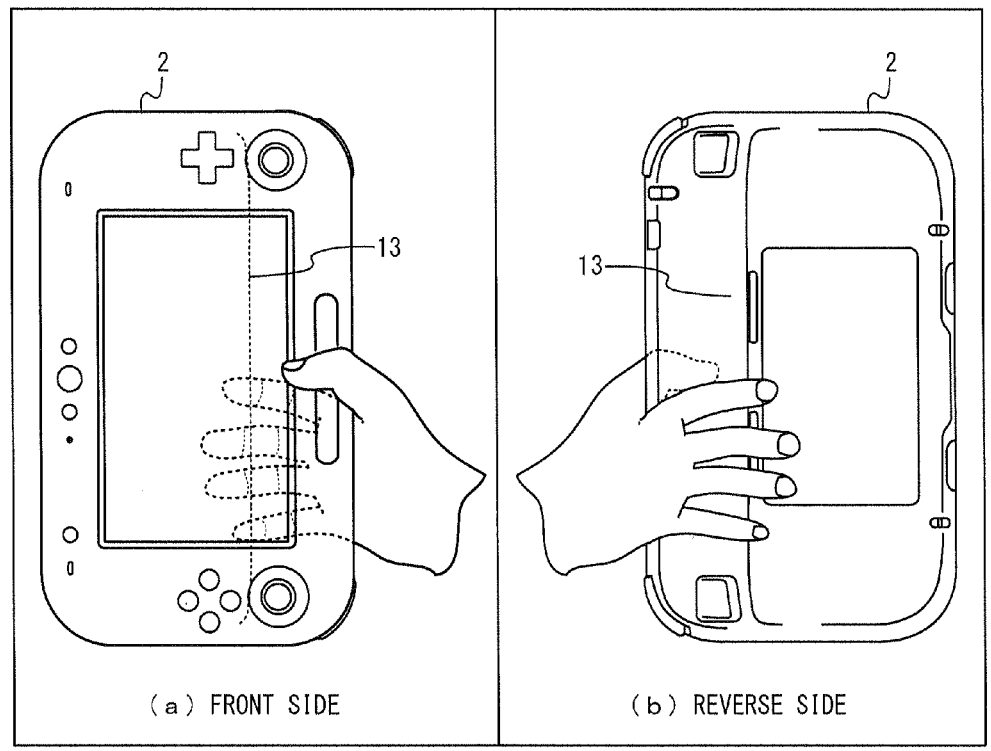
FIG. 5 is a diagram showing another example of how the controller device is held.
Figure 6:
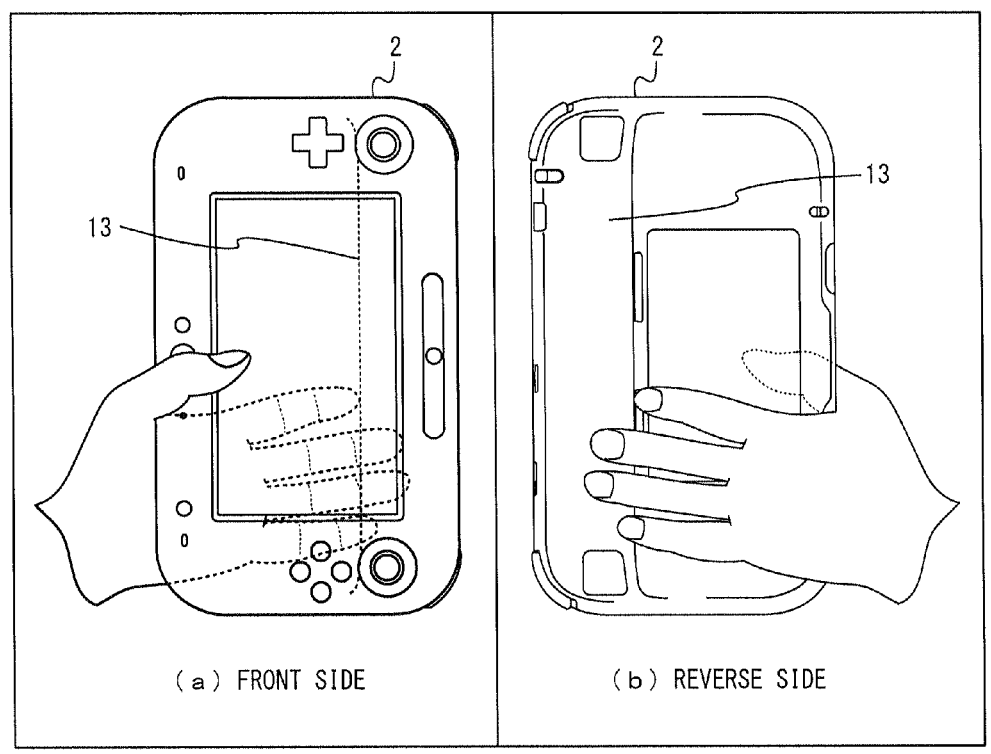
FIG. 6 is a diagram showing still another example of how the controller device is held.

Referring to FIGS. 4 to 11, a process (orientation determination process) for determining the orientation of the grip portion 13 of the controller device 2 (the mode of holding controller device 2) will now be described. Note that the present embodiment assumes a case where the controller device 2 is used in a portrait position (a way of holding such that the long side direction (the longitudinal direction) lies in the vertical orientation) as shown in FIGS. 4 to 6, for example. Note however that the method for determining the orientation of the grip portion 13 in the present embodiment is also applicable to a case where the controller device 2 is used in a landscape position.

Where the controller device 2 of the present embodiment is used in a portrait position, the user can stably hold the controller device 2 by having fingers rest on the grip portion 13 as shown in FIG. 4, for example. Now, if we assume that the user would hold the controller device 2 so that the grip portion 13 is located closer to the holding hand, the orientation of the grip portion 13 with respect to the center is reversed depending on whether the user holds the controller device 2 with the left hand or the right hand, since the grip portion 13 is provided lopsided with respect to the center. Specifically, where the user holds the controller device 2 with the left hand, as shown in FIG. 4, the grip portion 13 will be located on the left side with respect to the center (as seen from the front side of the housing 10). On the other hand, where the user holds the controller device 2 with the right hand, as shown in FIG. 5, the grip portion 13 will be located on the right side with respect to the center (as seen from the front side of the housing 10).

Even if the hand to be used to hold the controller device 2 can be identified (estimated), the orientation of the grip portion 13 will vary depending on the size of the hand of the user or the way of holding of his/her preference, etc. For example, a user with a big hand may possibly hold the controller device 2 so that the grip portion 13 is located on the side away from the holding hand, as shown in FIG. 6. Thus, where the grip portion 13 of the controller device 2 is provided lopsided with respect to the center, the orientation of the grip portion 13 that is easy for the user to hold varies from one user to another.

As described above, in the present embodiment, since the grip portion 13 of the controller device 2 is provided at a position lopsided with respect to the center, it is not appropriate to uniformly determine the orientation of the grip portion 13 during operation. With different orientations of the grip portion 13, even if the user intends to be performing the same operations on the controller device 2, the operations may be recognized as being different operations by the process of the information processing system 1, in which case the user may not be able to properly perform operations. For example, where the grip portion 13 is facing left (FIG. 4), the operation of sliding the touch position in the forward direction of the controller device 2 (in the upward direction in FIG. 4) will leave a trace of touch positions extending in the x-axis positive direction. On the other hand, where the grip portion 13 is facing right (FIG. 5), the same operation will leave a trace of touch positions extending in the x-axis negative direction, which is opposite to that where the grip portion 13 is facing left. Therefore, if the orientation of the grip portion 13 is not determined, the user may not be able to properly perform operations.

In view of this, in the present embodiment, the information processing system 1 determines the orientation of the grip portion 13, i.e., the orientation of the grip portion 13 as the user holds the controller device 2. Moreover, in the present embodiment, the information process (game control process) based on operations by the user is executed differently depending on the result of the orientation determination. Therefore, the information processing system 1 can properly execute the information process irrespective of the mode of holding the controller device 2 (whether the grip portion 13 is facing right or facing left). The orientation determination process will now be described.

(2-1) Outline of Orientation Determination Process

In the present embodiment, the orientation determination process is executed using the attitude of the controller device 2. That is, the information processing system 1 first calculates the attitude of the controller device 2. Then, the orientation of the grip portion 13 (with respect to the center of the surface on which the grip portion 13 is provided) is determined based on the attitude of the controller device 2.

FIG. 7 is a diagram showing an example of an orientation determination method according to the present embodiment. Note that the xyz coordinate system shown in FIG. 7 is a coordinate system defined with respect to the controller device 2 (see FIG. 2(*a*)). As shown in FIG. 7, if an attitude is calculated such that the downward direction is the x-axis negative direction while the controller device 2 is upright, it can be determined that the grip portion 13 is facing left (located on the left side with respect to the center). If an attitude is calculated such that the downward direction is the x-axis positive direction while the controller device 2 is upright, it can be determined that the grip portion 13 is facing right (located on the right side with respect to the center).

Note that in the present embodiment, two possible orientations of the grip portion 13 (two possible ways of holding the controller device 2) are assumed, and the information processing system 1 determines the orientation of the grip portion 13 between the two different orientations. In other embodiments, the orientation of the grip portion 13 may be determined between three or more different orientations. For example, where it is assumed that the portrait position and the landscape position may be both used, it may be determined which orientation the grip portion 13 is facing, from among the four orientations of up, down, left and right.

(2-2) Flow of Orientation Determination Process

In the present embodiment, the orientation determination process is executed before the start of a game using the controller device 2. Moreover, in the present embodiment, a calibration process for the attitude of the controller device 2 is executed, and the orientation determination process is executed before the calibration process. Thus, the orientation determination process is executed at least before executing a predetermined information process (the game control process and the calibration process to be described later) based on an input made on the controller device 2. Note that in other embodiments, the orientation determination process may be executed also during the predetermined information process (during a game).

Figure 8:
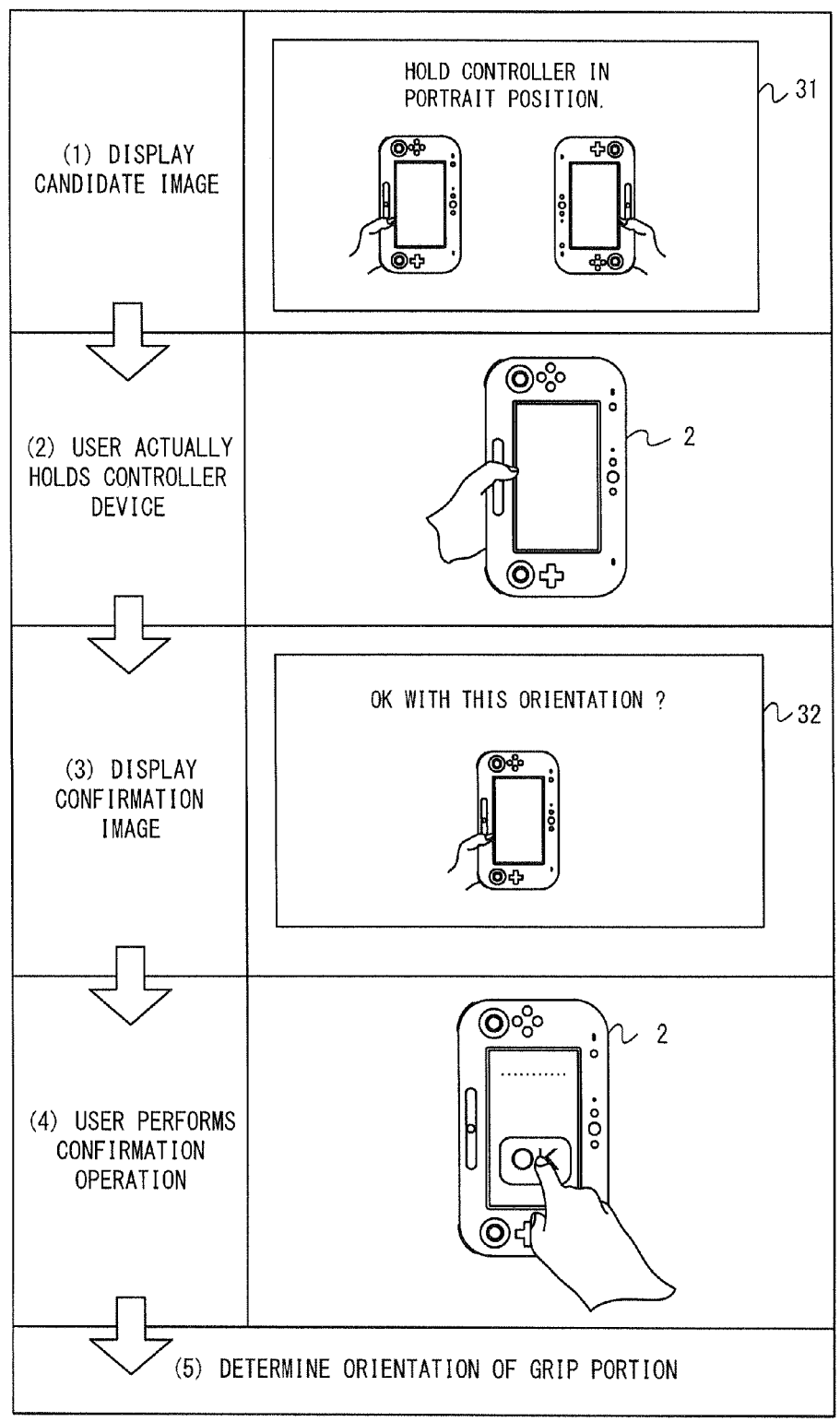
FIG. 8 is a diagram showing an example of a flow of the orientation determination method according to the present embodiment.

FIG. 8 is a diagram showing an example of a flow of the orientation determination method according to the present embodiment. As shown in FIG. 8, the flow of the orientation determination method is as follows: (1) a candidate image 31 is displayed; (2) the user actually holds the controller device 2; (3) a confirmation image 32 is displayed; (4) a confirmation operation by the user; and (5) the orientation determination.

(2-3) Displaying Candidate Image

Figure 9:
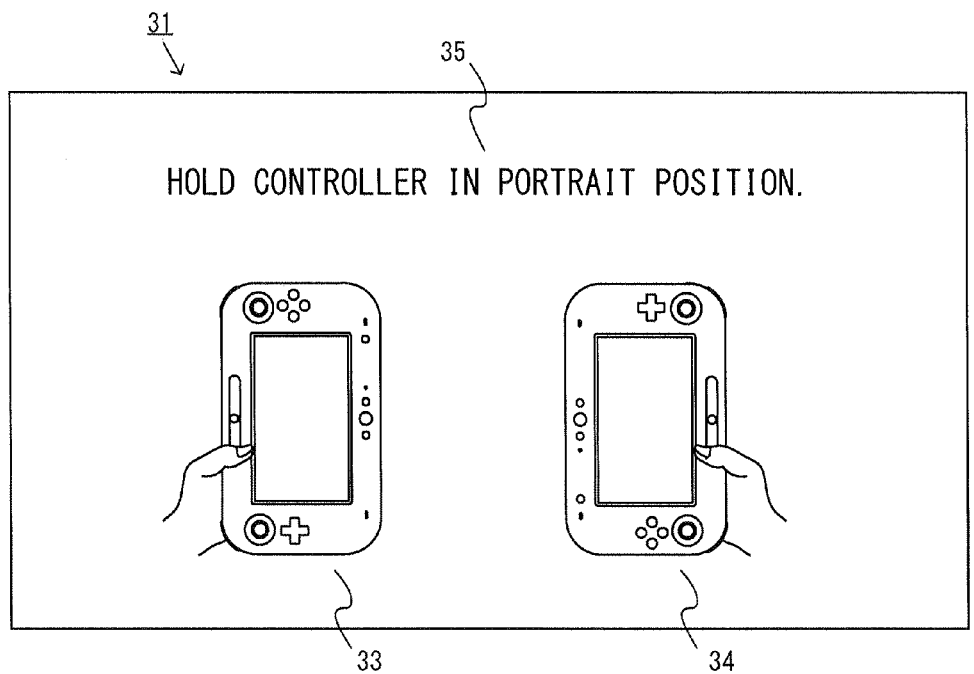
FIG. 9 is a diagram showing an example of a candidate image.

In the present embodiment, the candidate image 31 is presented to the user (see (1) of FIG. 8) before the orientation determination. FIG. 9 is a diagram showing an example of a candidate image. As shown in FIG. 9, the candidate image 31 of the present embodiment includes an image 33 representing a case where the grip portion 13 is facing left and an image 34 representing a case where the grip portion 13 is facing right. Thus, the candidate image 31 is an image representing candidates (choices) of the orientation of the grip portion 13 (ways of holding the controller device 2). That is, in the present embodiment, an image is displayed representing a plurality of states (of the controller device 2) with different orientations of the grip portion 13, and the orientation of the grip portion 13 is determined by selecting one of the orientations represented by the plurality of states.

In the present embodiment, the candidate image 31 includes an image 35 representing a sentence that reads "Hold controller in portrait position". The candidate image 31 may be an image representing drawings such as the images 33 and 34, or an image representing a sentence such as the image 35. In other embodiments, a sound representing the plurality of states may be output together with, or instead of, the candidate image 31. In other embodiments, the orientation determination may be made without displaying the candidate image 31.

With the candidate image 31 presented to the user, the user actually holds the controller device 2 in one of the ways represented by the candidate image 31 that the user prefers or that is easier for the user (see (2) in FIG. 8). By presenting the candidate image 31 to the user, the information processing system 1 can let the user know that there are a plurality of choices for the way of holding the controller device 2 and can show the specific choices to the user. Therefore, the user can easily choose one of a plurality of possible ways of holding that the user prefers.

In the present embodiment, as is clear from the images 33 and 34 shown in FIG. 9, the candidate image 31 represents modes of holding (ways of holding) the controller device 2 when the predetermined information process is executed. Thus, by presenting the candidate image 31 to the user, it is possible to teach the user how to hold the controller device 2 when the predetermined information process is executed.

Note that in the present embodiment, an attitude with respect to the direction of gravity is calculated using the detection result of the acceleration sensor 23, and the orientation of the grip portion 13 is determined using the attitude, the details of which will be described later. Therefore, in a state where the reverse surface of the housing 10 is horizontal, it is not possible to determine the orientation of the grip portion 13 based on the attitude with respect to the direction of gravity because the direction of gravity (with respect to the reverse surface) does not change even when the orientation of the grip portion 13 changes. On the other hand, in a state where the reverse surface of the housing 10 is vertical, it is possible to determine the orientation of the grip portion 13 based on the attitude with respect to the direction of gravity. Therefore, in the present embodiment, the information processing system 1 displays, as the candidate image 31, an image of the controller device 2 being upright (see FIG. 9). That is, the information processing system 1 displays an image representing the controller device 2 as seen from a direction generally perpendicular to the predetermined plane on which the grip portion 13 is provided (the reverse surface of the housing 10). Thus, since the user having seen the candidate image 31 holds the controller device 2 upright, the information processing system 1 can easily determine the orientation of the grip portion 13 using the detection result of the acceleration sensor 23. That is, with the candidate image 31 of the present embodiment, it is possible to guide the user to changing the attitude of the controller device 2 to an attitude such that the orientation of the grip portion 13 can be determined.

Note that in the present embodiment, the candidate image 31 is displayed both on the LCD 11 of the controller device 2 and on the television 4. Therefore, the user will more reliably see the candidate image 31. Note however that in other embodiments, the candidate image 31 may be displayed on at least one display device.

(2-4) Confirmation Process

In the present embodiment, when the user actually holds the controller device 2 in the way of holding represented by the candidate image 31 in response to the display of the candidate image 31, a confirmation process is executed. That is, the confirmation image 32 is displayed (see (3) shown in FIG. 8) for confirming the way of holding the controller device 2, and the user performs a confirmation operation in response to this (see (4) shown in FIG. 8). The details of the confirmation process will now be described.

After displaying the candidate image 31, the information processing system 1 calculates the attitude of the controller device 2 to determine whether the orientation of the grip portion 13 has become one of the two orientations represented by the candidate image 31. When the orientation of the grip portion 13 has become one of the two orientations, the information processing system 1 displays the confirmation image 32.

Figure 10:
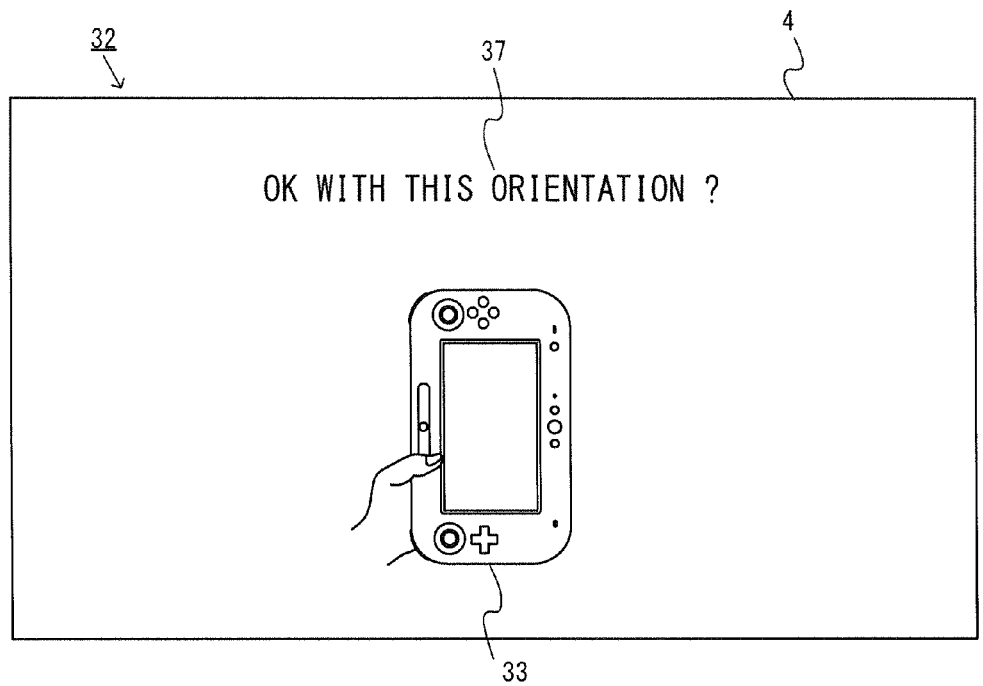
FIG. 10 is a diagram showing an example of how the display devices appear when a confirmation image is displayed.
Figure 10:
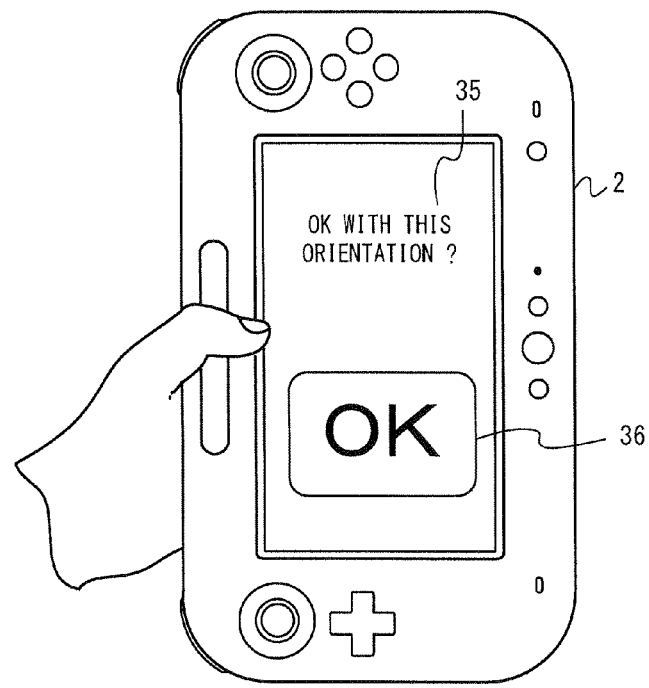

FIG. 10 is a diagram showing an example of how the display devices appear when a confirmation image is displayed. The confirmation image 32 is an image that represents the actual (current) attitude of the controller device 2 (or an attitude close thereto), selected from among the attitudes of the controller device 2 represented by the candidate image 31. That is, the information processing system 1 displays an image that represents the current calculated attitude of the controller device 2, selected from among the images 33 and 34 included in the candidate image 31. For example, in FIG. 10, since the actual controller device 2 is in an attitude such that the grip portion 13 is facing left, the image 33 representing such an attitude is displayed on the television 4. As described above, in the present embodiment, an image representing the actual (current) orientation of the grip portion 13 is displayed as the confirmation image 32. Therefore, the user can easily confirm the orientation of the grip portion 13.

The confirmation image 32 may be any image representing one of the orientations of the grip portion 13 represented by the candidate image 31 that has been selected by the user. The confirmation image 32 may be displayed either on the controller device 2 or on the television 4, as long as it is displayed on at least one display device. In other embodiments, a sound representing the selected orientation may be output together with, or instead of, the confirmation image 32. In other embodiments, the orientation of the grip portion 13 may be determined without displaying the confirmation image 32. Note that even in a case where the confirmation image 32 is not displayed, the information processing system 1 may determine the orientation of the grip portion 13 on the condition that there is a confirmation operation by the user.

In the present embodiment, in a case where the confirmation image 32 is displayed on the television 4, an image (confirmation button) 36 used for performing the confirmation operation is displayed on the controller device 2 as shown in FIG. 10. That is, in a state where the confirmation image 32 is displayed, the information processing system 1 accepts a confirmation operation performed on the controller device 2. The confirmation operation may be any operation, and it is in the present embodiment an operation of touching on the confirmation button 36. Note that in the present embodiment, the information processing system 1 displays an image 37 representing a sentence "OK with this orientation?" on the television 4 and on the controller device 2, and prompts the user to perform the confirmation operation.

When the confirmation image 32 is presented, the user performs the confirmation operation (see (4) shown in FIG. 8) if the current way of holding is the intended way of holding. On the other hand, if the user does not like the current way of holding, the user can re-hold the controller device 2. Then, in the confirmation image 32, the image 33 or 34 is selectively displayed according to the orientation of the grip portion 13 (the attitude of the controller device 2).

Thus, in the orientation determination process of the present embodiment, the information processing system 1 determines the orientation of the grip portion 13 (i.e., finalizes the orientation of the grip portion 13) after confirming the intention of the user (confirmation operation). In the present embodiment, since the orientation of the grip portion 13 is finalized on the condition that there is a confirmation operation by the user, it is possible to more accurately determine the orientation of the grip portion 13. If the user does not like it when the user actually holds the controller device 2, the user can change the orientation of the grip portion 13 to another orientation, and therefore the user is more likely to be able to use the controller device 2 while holding the controller device 2 in the way the user likes. Note that in other embodiments, the information processing system 1 may execute the orientation determination without the confirmation operation. For example, the information processing system 1 may determine whether the orientation of the grip portion 13 has become one of a plurality of orientations represented by the candidate image 31, and the information processing system 1 may use the orientation at that point in time as the determination result.

(2-5) Orientation Determination

In response to the confirmation operation by the user, the information processing system 1 determines the orientation of the grip portion 13 (see (5) shown in FIG. 8). That is, the orientation of the grip portion 13 at the point in time when the confirmation operation is performed is used as the determination result. Then, it is considered that the orientation of the grip portion 13 has been determined Note that the specific method of orientation determination may be any method and, for example, the orientation of the grip portion 13 may be calculated from an attitude that is calculated at the point in time when the confirmation operation is performed, or the orientation of the grip portion 13 corresponding to the confirmation image 32 displayed on the television 4 at that point in time may be used as the determination result.

As described above, in the present embodiment, in a case where the candidate image 31 is displayed, the information processing system 1 determines whether the controller device 2 has assumed a predetermined attitude represented by the candidate image 31. Then, the orientation of the grip portion 13 when the controller device 2 assumes the predetermined attitude is determined That is, in the present embodiment, the candidate image 31 representing candidate ways of holding the controller device 2 is displayed ((1) shown in FIG. 8); the user is allowed to actually hold the controller device 2 ((2) shown in FIG. 8); and the orientation of the grip portion 13 when the user actually holds the controller device 2 is determined ((5) shown in FIG. 8). Then, since the user is allowed to actually hold the controller device 2, an erroneous operation (erroneous input) is unlikely, and it is possible to accurately determine the orientation of the grip portion 13.

In the present embodiment, through the flow of (1) to (5) shown in FIG. 8, (a) presentation of choices of the way of holding the controller device 2; (b) guidance (teaching) of the way of holding; and (c) estimation and confirmation of the way of holding selected by the user can be done through a natural flow while the orientation determination process is executed. Therefore, the user can comfortably perform the operation without feeling as if the user were forced to perform troublesome setting operations.

As is clear from FIG. 11, etc., to be discussed below, the mode of holding the controller device 2 when the orientation of the grip portion 13 is determined is the same as that when the user performs the game operation (when the calibration process or the game control process is executed). That is, in the present embodiment, as the user is allowed to actually hold the controller device 2 in the orientation determination process, the user can start the game operation without having to re-hold the controller device 2. Then, since the game can be started naturally without making the user conscious of the orientation determination process, the user can comfortably perform operations without feeling as if the user were made to perform extra operations.

(2-6) Attitude Calculation Method

While the method for calculating the attitude of the controller device 2 in the orientation determination process may be any method, the information processing system 1 calculates the attitude based on the detection result of the acceleration sensor 23 of the controller device 2 in the present embodiment. Specifically, the information processing system 1 calculates the attitude of the controller device 2 with respect to the direction of gravity based on the detection result of the acceleration sensor 23. The orientation of the grip portion 13 can be determined based on the calculated attitude. In the present embodiment, it can be determined that the grip portion 13 is facing left when the direction of gravity calculated from the detection result of the acceleration sensor 23 is extending in the x-axis negative direction as shown in FIG. 7. It can be determined that the grip portion 13 is facing right when the direction of gravity is extending in the x-axis positive direction.

(2-7) Information Process Based on Determination Result

After the determination process, the predetermined information process is executed where an operation performed on the controller device 2 is used as an input based on the determination result. The information processing system 1 executes the predetermined information process so that the content of the process differs depending on the result of the determination process (whether the grip portion 13 is facing right or facing left). Note that in the present embodiment, the calibration process and the game control process are executed as the information process. The game control process is a process of allowing the game to progress while using game operations made on the controller device as an input. The calibration process will be described later.

Figure 11:
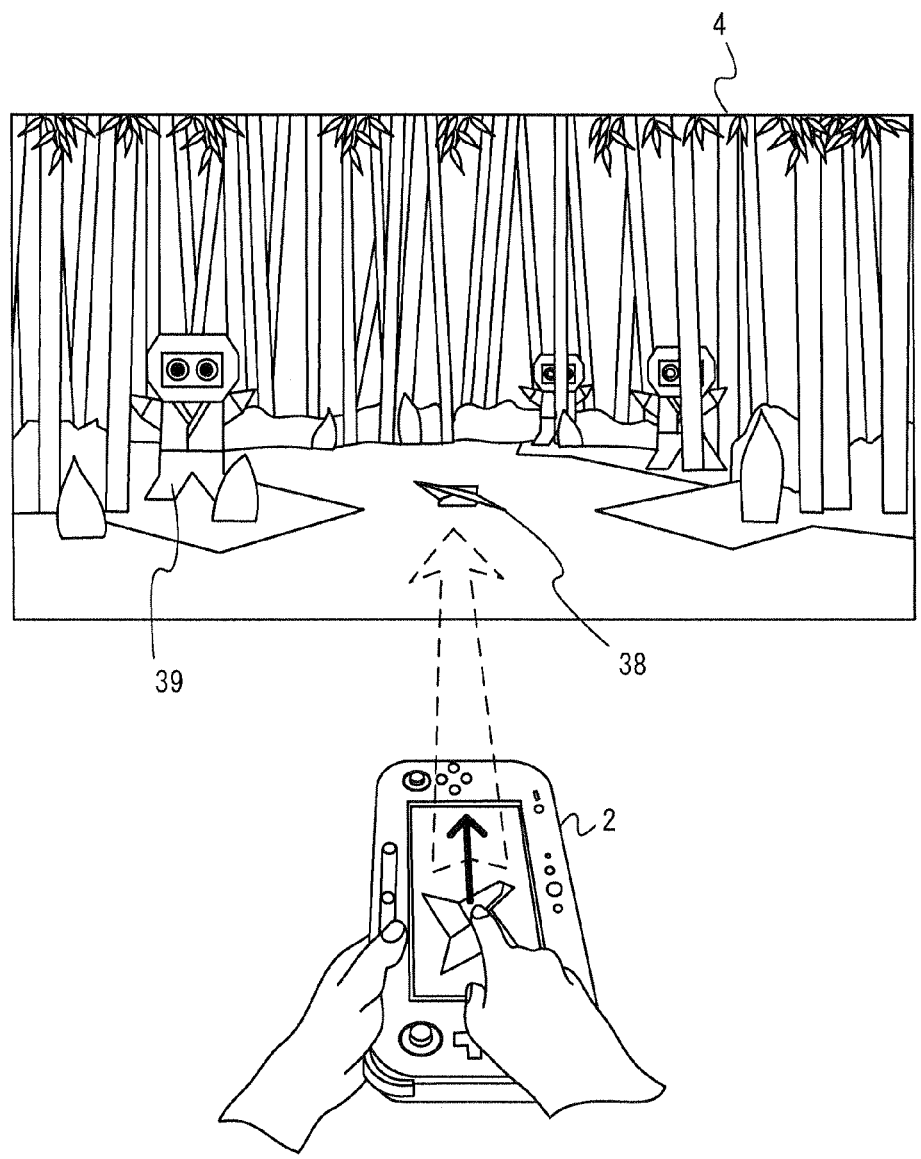
FIG. 11 is a diagram showing an example of a game to be executed by a game control process.

FIG. 11 is a diagram showing an example of a game to be executed by the game control process. In FIG. 11, a shooting game is played with the aim of launching a predetermined object (a shuriken, or a throwing star) 38 using the controller device 2 to hit an enemy object 39. In the present embodiment, the user performs a touch input operation (referred to also as a "slide operation"; see an arrow shown in FIG. 11) of drawing a line in the forward direction on the touch panel 12 while pointing the controller device 2 in an intended launch direction, thereby launching the shuriken 38 in the launch direction. As the launched shuriken 38 is displayed on the television 4, the user can play the game shown in FIG. 11 feeling as if the user were actually shooting a shuriken from the user's hand.

In the present embodiment, the information processing system 1 executes the predetermined information process using at least the attitude of the controller device 2 as an input. Specifically, the information processing system 1 determines the launch direction of the shuriken 38 based on the attitude of the controller device 2. More specifically, the launch direction is determined depending on the forward direction of the controller device 2 when the controller device 2 is held in a portrait position. Now, the forward direction of the controller device 2 varies depending on whether the orientation of the grip portion 13 is right or left. Therefore, in the present embodiment, the information processing system 1 sets the forward direction of the controller device 2 depending on the orientation determined in the orientation determination process, and determines the launch direction depending on the set forward direction. Specifically, where the orientation of the grip portion 13 is left (as shown in FIG. 11), the information processing system 1 sets the x-axis positive direction of the controller device 2 as the forward direction (see FIG. 7). On the other hand, where the orientation of the grip portion 13 is right, the information processing system 1 sets the x-axis negative direction of the controller device 2 as the forward direction (see FIG. 7). Thus, in the present embodiment, the information processing system 1 executes the process in which the attitude of the controller device 2 is used as an input so that the content of the process varies depending on the orientation of the grip portion 13.

Figure 12:
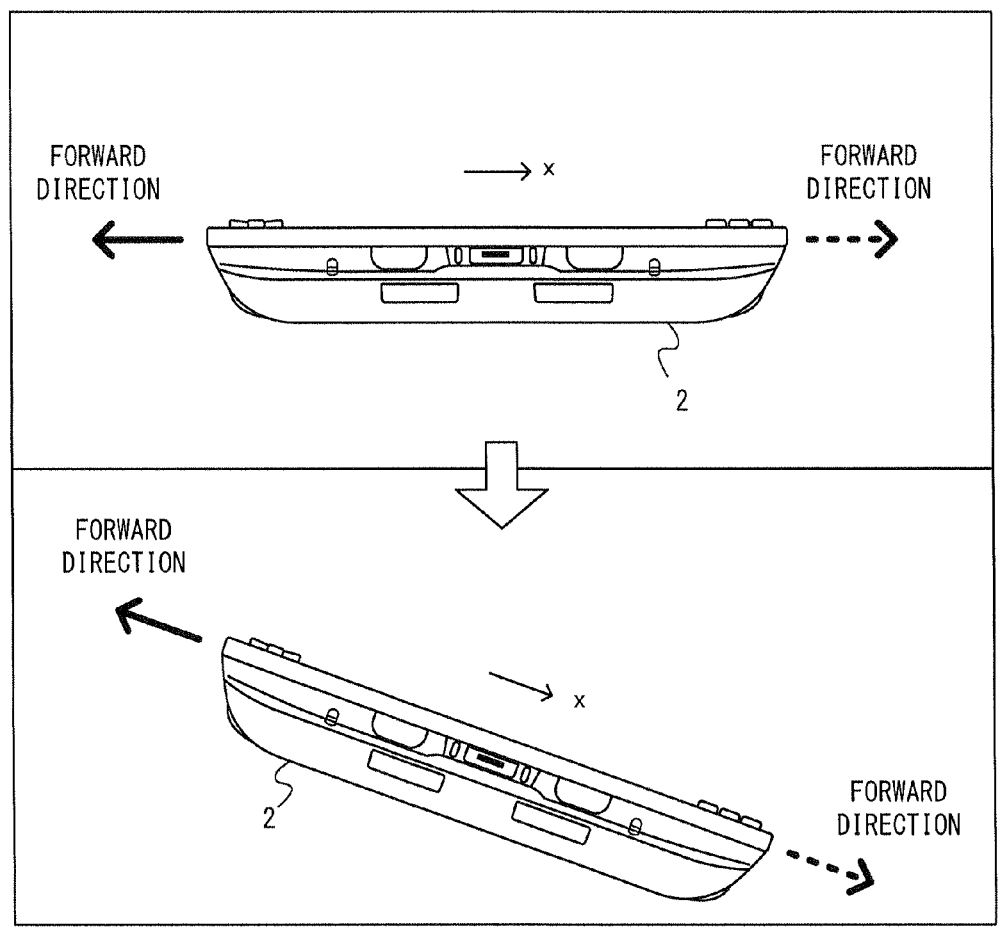
FIG. 12 is a diagram showing an example of how the attitude of the controller device changes with respect to the pitch direction.
Figure 13:
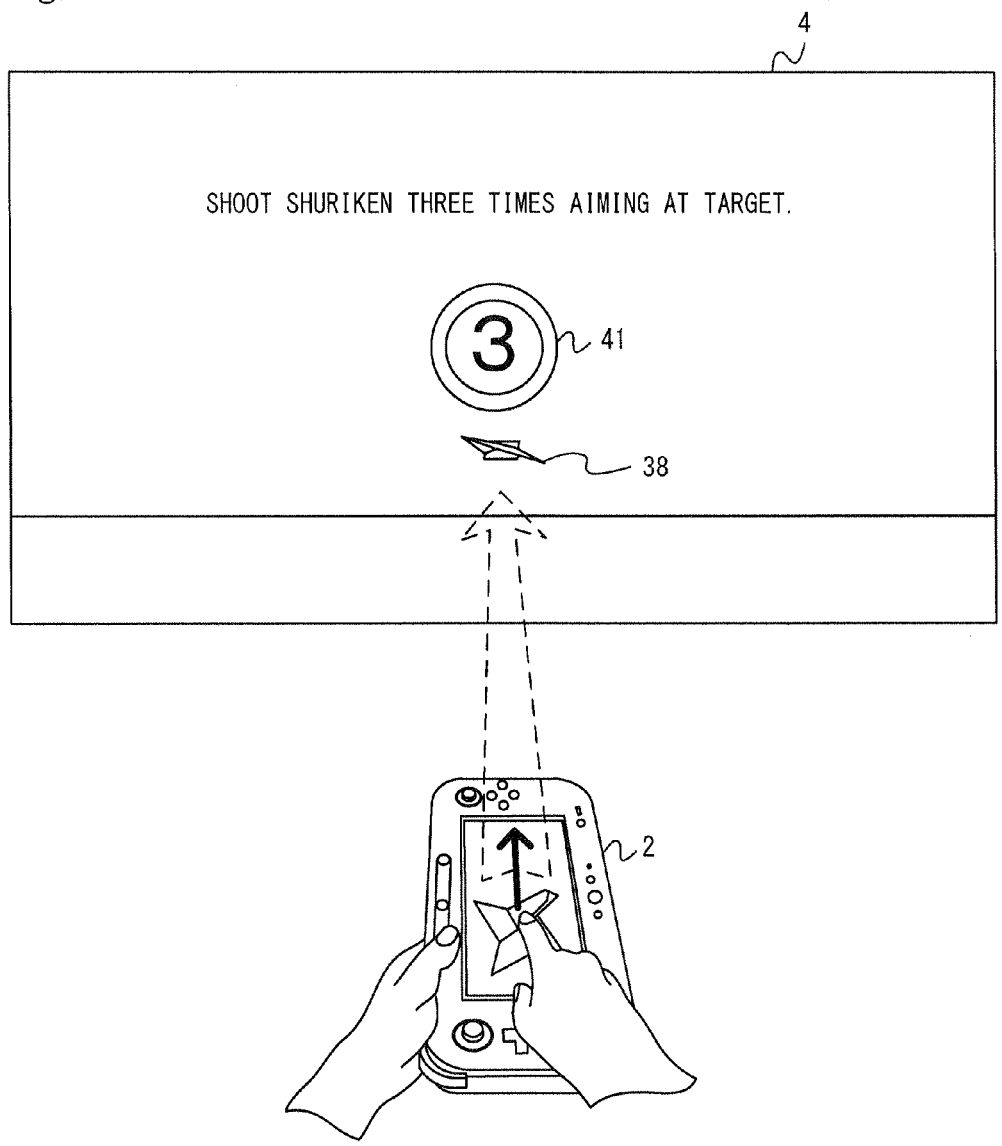
FIG. 13 is a diagram showing an example of an image displayed in a calibration process.

Now, the orientation in which the launch direction changes depending on the change in the attitude of the controller device 2 may differ depending on the orientation of the grip portion 13. FIG. 12 is a diagram showing an example of how the attitude of the controller device 2 changes with respect to the pitch direction. Consider a case where the attitude changes in such a manner that the x-axis positive direction of the controller device 2 tilts down as shown in FIG. 12. If this occurs where the grip portion 13 has been determined to be facing right (the solid-line arrow shown in FIG. 12 is the forward direction), it is assumed that the user has tilted up the forward direction of the controller device 2. On the other hand, if this occurs where the grip portion 13 has been determined to be facing left (the dotted line shown in FIG. 13 is the forward direction), it is assumed that the user has tilted down the forward direction of the controller device 2. Thus, for the change in the pitch direction (the attitude change with respect to the left-right direction (the y-axis direction)), the orientation in which the launch direction has assumedly changed in response to the change in the attitude of the controller device 2 differs depending on the determination result of the orientation of the grip portion 13. As for the pitch direction, also for the roll direction (the attitude change about an axis extending in the up-down direction (the x-axis direction), the orientation in which the launch direction changes varies depending on the orientation determination result. In contrast, for the yaw direction (the attitude change about an axis extending in the z-axis direction), the orientation in which the launch direction changes stays constant irrespective of the determination result.

In view of this, in the present embodiment, depending on the determination result, the information processing system 1 reverses the orientation in which a direction in the virtual space (the launch direction) changes in response to the attitude change of the controller device 2 for the pitch direction and/or the roll direction. For example, for the pitch direction, where the grip portion 13 is determined to be facing right, the information processing system 1 changes the launch direction upward in response to a change in the attitude of the controller device 2 as shown in FIG. 13. On the other hand, where the grip portion 13 is determined to be facing left, the information processing system 1 changes the launch direction downward in response to a change in the attitude of the controller device 2 as shown in FIG. 13. On the other hand, for the yaw direction, the orientation in which a direction in the virtual space changes in response to the attitude change of the controller device 2 is kept constant (not reversed) irrespective of the determination result. As described above, in a case where a game control process is executed in which a direction in the virtual space is changed in response to a change in the attitude of the controller device 2, the direction can be calculated appropriately.

The information processing system 1 executes the predetermined information process using at least the position detected by the touch panel 12 (the touch position) as an input. Specifically, the shuriken 38 is launched in response to a slide operation in the forward direction on the touch panel 12. The forward direction is the same as the forward direction used for determining the launch direction as described above. Therefore, in the present embodiment, the information processing system 1 executes a process in which a touch operation on the touch panel 12 is used as an input so that the content of the process varies depending on the orientation of the grip portion 13. Specifically, the information processing system 1 executes the process of recognizing touch positions while reversing the up-down direction (the x-axis direction) on the touch panel 12 depending on the determination result.

Also, the information processing system 1 changes the orientation of the image displayed on the LCD 11 of the controller device 2 depending on the result of the orientation determination. That is, the orientation of the image displayed on the LCD 11 is adjusted so that the forward direction determined based on the determination result extends in the upward direction.

As described above, in the present embodiment, an information process is executed which varies depending on the determination result of the orientation determination. Specifically, the information processing system 1 executes a process of which the content varies depending on the determination result so that when a predetermined operation is performed on the controller device 2, the same process result is obtained irrespective of the orientation of the grip portion 13. For example, in the present embodiment, whether the grip portion 13 is facing right or facing left, the user can set the launch direction through an operation of directing the forward direction of the controller device 2 in an intended direction, and can perform a shooting action though an operation of drawing a line in the forward direction on the touch panel 12. Thus, the user can perform game operations using the same operation, irrespective of the orientation of the grip portion 13 as the controller device 2 is held by the user. As described above, by executing different information processes depending on the determination result of the orientation determination, the information processing system 1 can execute the information process with appropriate content in accordance with the orientation of the grip portion 13. Since the game operation is the same, irrespective of the way of holding being selected by the user, the user can freely select a way of holding that is easy for the user.

Note that in the present embodiment, in an information process of which the content varies depending on the determination result of the orientation determination, the information processing system 1 reverses the direction of the input made on the touch panel 12 depending on the determination result and reverses the direction (the launch direction) calculated based on the attitude of the controller device 2 depending on the determination result. In other embodiments, the information process may be of any content. For example, the information processing system 1 may vary the assignment of an operation unit (button) used for making a predetermined instruction depending on the determination result of the orientation determination.

3. Calibration Process

Referring to FIGS. 11 to 17, a calibration process to be executed by the information processing system 1 will now be described. In the present embodiment, a game control process is executed which allows the game to progress using game operations made on the controller device 2 as an input, and the game control process is executed based on the attitude of the controller device 2. The calibration process is a process of determining the attitude (referred to as the "reference attitude") used as a reference for the attitude to be used in the game control process.

(3-1) Game Operations in Calibration Process and Game Control Process

In the game control process of the present embodiment, as shown in FIG. 11, the launch direction is specified as the user directs the predetermined direction of the controller device 2 (herein the forward direction of the controller device 2) in the intended direction, and the shuriken 38 is launched in the launch direction in response to a touch input operation of drawing a line in the forward direction on the touch panel 12.

On the other hand, FIG. 13 is a diagram showing an example of an image displayed in the calibration process. As shown in FIG. 13, in the calibration process, a target 41 is displayed on the television 4. Also, a message "Shoot shuriken three times aiming at target" is displayed on the television 4. In response to this, the user directs the controller device 2 toward the target 41 and performs a predetermined game operation.

Herein, the predetermined game operation is a game operation similar to that during the game, i.e., a slide operation performed with the controller device 2 being directed in the intended launch direction. That is, in the calibration process of the present embodiment, the user is made to perform a game operation similar to (of the same kind as) the game operation performed during the game in order to determine the reference attitude. Therefore, since the user can perform an operation for calibration through the same operation as the operation performed during the game, the information processing system 1 can execute the calibration process in a natural game operation without giving the user a sense of unnaturalness.

Note that the predetermined game operation is not limited to an operation of specifying a position on the input surface (more specifically, a slide operation), but may be any operation such as an operation of pressing a button. The game operation in the calibration process and that in the game control process do not have to be exactly the same. For example, the direction of the slide operation may be any direction, and the direction of the slide operation in the calibration process does not have to be the same as that in the game control process. For example, if a gesture input operation of drawing the same shape (the same kind of a shape) on the touch panel 12 both in the calibration process and in the game control process, as the predetermined game operation, it is possible to execute the calibration process without giving the user a sense of unnaturalness. The game operation in the calibration process and that in the game control process do not have to be exactly the same, and it is possible to execute the calibration process without giving the user a sense of unnaturalness if the same kind of an action control (e.g., a control of having an object execute the same action) is performed by the game operation. In other words, if the same kind of an action control is performed by the game operation in the calibration process and by the game operation in the game control process, these game operations can be said to be the same (or of the same kind).

(3-2) Flow of Calibration Process

Figure 14:
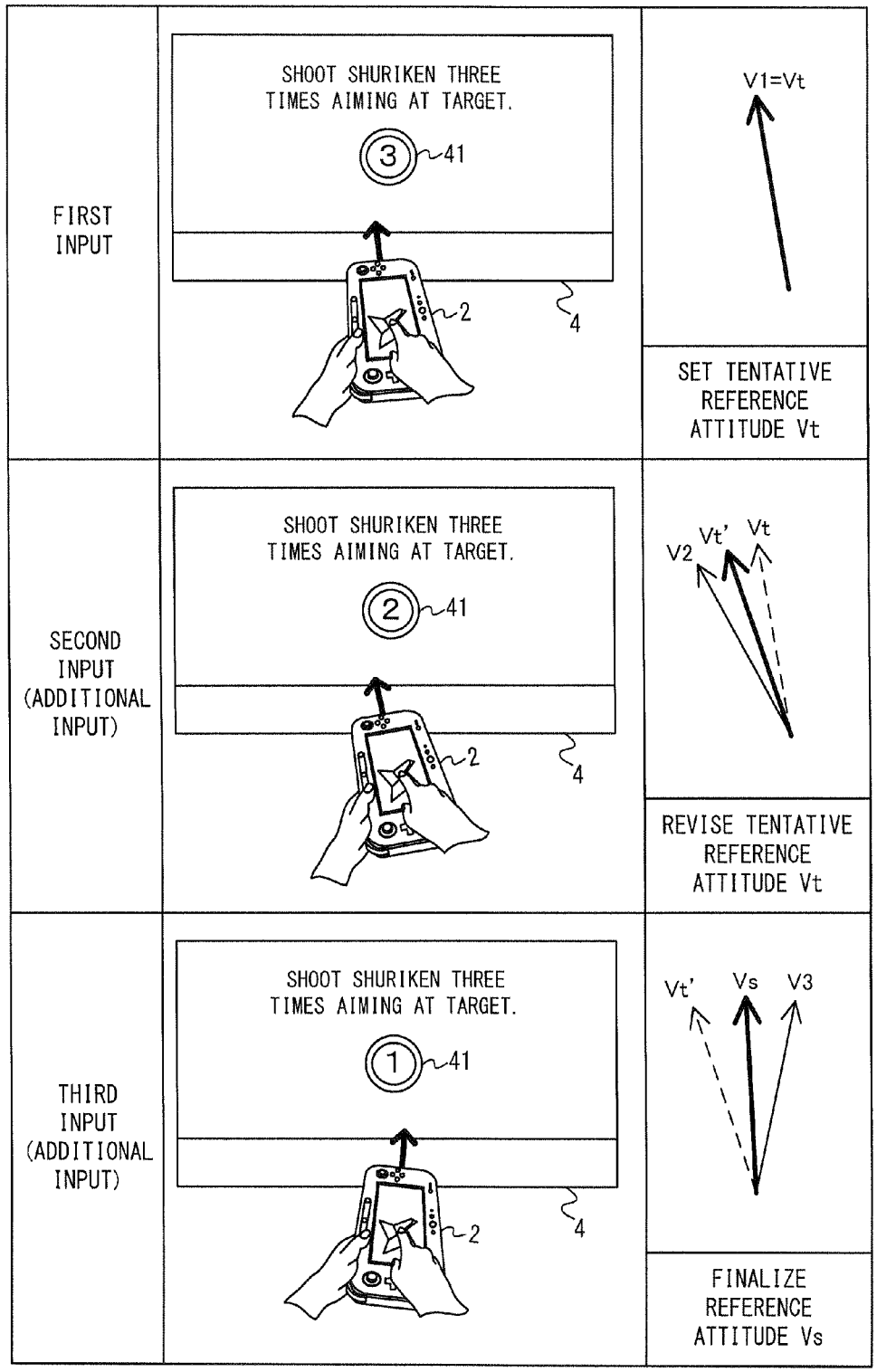
FIG. 14 is a diagram showing an example of a calibration process according to the present embodiment.

The flow of the calibration process in the present embodiment will now be described. FIG. 14 is a diagram showing the flow of the calibration process in the present embodiment. In the present embodiment, an input (made through the predetermined game operation) is accepted in a plurality of iterations, so as to determine a reference attitude using the attitudes of the controller device 2 at points in time when the inputs are made.

Note that the present embodiment is directed to an example case where the calibration process is executed for the attitude with respect to the yaw direction (the horizontal direction) in the real space (the attitude for rotation about an axis extending in the vertical direction). Note however that the calibration process in the present embodiment can be applied to the attitude for the pitch direction and the roll direction.

While the calibration process is executed before the game using the controller device 2 (before the game control process) in the present embodiment, it may be executed during the game in other embodiments.

(First Input)

The information processing system 1 first accepts the predetermined game operation as a first input. Then, the attitude of the controller device 2 (the vector V1 shown in FIG. 14; note that vectors shown in the figures represent the forward direction of the controller device 2) at a point in time when the first input is made. This attitude is set as the tentative reference attitude (the vector Vt shown in FIG. 14).

In the present embodiment, the first input is accepted irrespective of the direction of the controller device 2 for the yaw direction. That is, when the predetermined game operation is performed, the information processing system 1 accepts the game operation as the first input, irrespective of the attitude of the controller device 2 for the yaw direction. Therefore, the user can play the game while freely directing the controller device 2 in any direction, in addition to the common mode of use in which the user directs the controller device 2 toward the television 4.

Note that in the present embodiment, for the pitch direction, the first input is accepted on the condition that the forward direction of the controller device 2 is closer to the horizontal direction than a predetermined reference. That is, when the predetermined game operation is performed with the angle between the forward direction of the controller device 2 and the horizontal direction being greater than or equal to a predetermined angle, the information processing system 1 does not take the game operation as the first input (the game operation is ignored). For the roll direction, the first input is accepted on the condition that the normal direction to the surface of the controller device 2 (the surface of the LCD 11) is closer to the vertically upward direction than a predetermined reference. In the present embodiment, since it is expected that the controller device 2 is used in an attitude that is closer to the horizontal direction than to the vertical direction with the LCD 11 in a vertically upward direction, it can be assumed to be an erroneous operation or an erroneous detection when the conditions are not satisfied. Note that in other embodiments, for each of the roll, pitch and yaw directions, the condition for the first input may or may not be set.

(Second Input)

After the first input, the information processing system 1 further accepts the predetermined game operation as an additional input. In the present embodiment, two inputs, i.e., the second input and the third input, are accepted as additional inputs. Note that the number of additional inputs may be any number as long as it is one or more in other embodiments.

After the first input, the information processing system 1 accepts a second input, and calculates the attitude of the controller device 2 (the vector V2 shown in FIG. 14) at a point in time when the second input is made. In the present embodiment, the tentative reference attitude is revised using the attitude corresponding to the second input. Specifically, the information processing system 1 combines together the tentative reference attitude (the vector Vt) and the attitude corresponding to the second input (the vector V2) at a predetermined ratio. While the predetermined ratio may be any ratio, the two attitudes are combined together at a ratio of 1:1 in the present embodiment. As shown in FIG. 14, the resultant vector is set as a revised tentative reference attitude (the vector Vt').

(Third Input)

After the second input, the information processing system 1 accepts a third input, and calculates the attitude of the controller device 2 (the vector V3 shown in FIG. 14) at a point in time when the third input is made. In the present embodiment, the reference attitude is determined by revising the tentative reference attitude using the attitude corresponding to the third input. Specifically, the information processing system 1 combines together the tentative reference attitude (the vector Vt') and the attitude corresponding to the third input (the vector V3) at a predetermined ratio. While the predetermined ratio may be any ratio, the two attitudes are combined together at a ratio of 1:1 in the present embodiment. The resultant vector is determined to be the reference attitude (the vector Vs).

(Condition for Additional Inputs)

Figure 15:
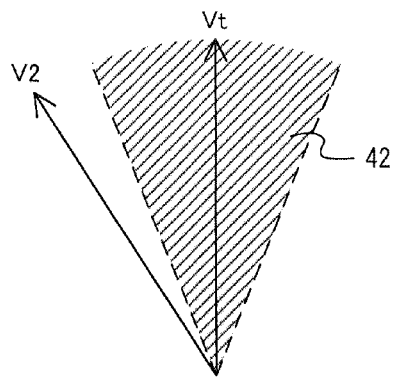
FIG. 15 is a diagram showing an example of a tentative reference attitude and a predetermined range.

In the present embodiment, the additional input (the second and third inputs) is accepted on the condition that the input is made in a state where the attitude of the controller device 2 is within a predetermined range defined by the tentative reference attitude. FIG. 15 is a diagram showing an example of a tentative reference attitude and a predetermined range. In FIG. 15, the vector Vt represents the tentative reference attitude, and the vector V2 represents the attitude of the controller device 2 when the second input is made. In the present embodiment, a predetermined range 42 is defined by the tentative reference attitude (the vector Vt). In FIG. 15, the predetermined range 42 is a range within a predetermined angle with the direction of the tentative reference attitude being the center. Note that in other embodiments, the predetermined range 42 may be defined using the tentative reference attitude, and may be set to be a range that does not include the tentative reference attitude as will be described later in "(3-4) Other process examples", for example. When the predetermined game operation is performed with the attitude of the controller device 2 being within the predetermined range 42, the information processing system 1 accepts the game operation as an additional input. Note that the tentative reference attitude may differ between the second input and the third input, and the predetermined range 42 may differ therebetween, but the second input and the third input are the same in that the predetermined range 42 is defined using the tentative reference attitude (specifically, defined to be a range within a predetermined angle with the direction of the tentative reference attitude being the center).

In the present embodiment, the predetermined range 42 is set as a range corresponding to the target 41. That is, where the launch direction is calculated using the tentative reference attitude as the reference attitude (as in the game control process), a range of the attitude of the controller device 2 such that the shuriken 38 will hit the target 41 is set as the predetermined range 42. Thus, the user can recognize the predetermined range 42, and can more easily make an input (a predetermined game operation) in the calibration process.

As described above, an additional input is accepted on the condition that the attitude of the controller device 2 is within the predetermined range. Therefore, if the user performs the predetermined game operation in an attitude that is totally different from the tentative reference attitude in an erroneous operation, the game operation is not considered as being an additional input. Thus, it is possible to precisely determine the reference attitude by ignoring inputs from erroneous operations. Note that in other embodiments, such a condition may be absent with the additional input, as with the first input.

In the present embodiment, if a predetermined game operation that does not satisfy the condition is performed, the tentative reference attitude is reset. That is, the information processing system 1 cancels the setting of the tentative reference attitude if the predetermined game operation is performed with the attitude of the controller device 2 being out of the predetermined range 42, after the first input and before the completion of a predetermined number of additional inputs. If the predetermined game operation is performed after the cancellation, the game operation is accepted as the first input. That is, when the setting of the tentative reference attitude is cancelled, the information processing system 1 re-sets, as the tentative reference attitude, the attitude of the controller device 2 at the point in time when the predetermined game operation is performed after the cancellation of the setting. Thus, in the present embodiment, if the predetermined game operation is performed in a direction that is significantly different from the tentative reference attitude, the tentative reference attitude is reset, and the user starts over the first input and the additional input. Thus, when the user erroneously performs a predetermined game operation, the user can start over the input, whereby it is possible to precisely determine the reference attitude.

(Method for Determining Reference Attitude)

As described above, in the present embodiment, in response to a predetermined number (herein, two) of additional inputs made, the information processing system 1 determines the reference attitude using the tentative reference attitude and the attitude of the controller device 2 at a point in time when the predetermined number of additional inputs are made. Thus, in the present embodiment, the reference attitude is determined based on a plurality of attitudes corresponding to a plurality of inputs, and it is therefore possible to precisely determine the reference attitude.

Note that in other embodiments, the reference attitude may be determined using at least one of the attitudes corresponding to a plurality of inputs. For example, when a predetermined number of additional inputs are made, the information processing system 1 may determine the tentative reference attitude as being the reference attitude. That is, when additional inputs are made satisfying the condition regarding the predetermined range, after the first input is made, the attitude corresponding to the first input may be set as the reference attitude. It is still possible to appropriately determine the reference attitude as in the present embodiment.

In the present embodiment, in response to an additional input (second input), the information processing system 1 updates (revises) the tentative reference attitude using the attitude of the controller device 2 at a point in time when the additional input is made. Thus, since the predetermined range 42 changes in response to the revision of the tentative reference attitude, the predetermined range 42 can be changed after each input so that it is an appropriate range.

(3-3) Control in Calibration Process

In the present embodiment, when the user performs the predetermined game operation in the calibration process, the information processing system 1 executes a control process similar to the game control process. That is, as shown in FIG. 13, in response to the predetermined game operation by the user, the shuriken 38 is launched in the launch direction in accordance with the attitude of the controller device 2 as in the game. In the present embodiment, the information processing system 1 performs a control of launching the shuriken 38 in response to each of the inputs (the first input and the additional inputs). Note however that in other embodiments, the control may be performed in response to at least one of the inputs.

As described above, the information processing system 1 executes the same kind of a control as the control of the action of an object in the game control process, in response to at least one of the first input and a predetermined number of additional inputs. Thus, in response to a game operation similar to that during the game, an action similar to that during the game is performed in the virtual space. Therefore, the user will consider the work to be done in the calibration process as if it were a practice of the game operation, for example, and it is therefore possible to further reduce the sense of unnaturalness of the calibration process.

Note that in the present embodiment, the information processing system 1 performs a control of moving an object in a direction that is determined based on the attitude of the controller device 2, as the control to be performed in the calibration process and in the game control process. In other embodiments, the control may be of any kind, and may be, for example, a control in which the user controls an object to execute the same action (e.g., an action of turning toward a direction determined based on the attitude) both in the calibration process and in the game control process.

The control in the calibration process may be any control of the same kind as the control in the game control process, and they do not have to exactly coincide with each other. For example, the object to be controlled in one process may differ from that in the other process, e.g., shurikens may be launched in the game control process whereas stones may be thrown in the calibration process. The algorithm of action in one process may differ from that in the other process, e.g., the object moves in a straight line in one process whereas the object moves describing a parabola.

While the game image in the game control process and the calibration process is displayed on the television 4 in the present embodiment, it is only needed to be displayed at least on one display device, and the game image may be displayed on the LCD 11 of the controller device 2.

Note that in the present embodiment, as shown in FIG. 13, an image (number) is on the target 41 representing the number of inputs to be made. While the image represents the number of inputs to be made in the predetermined game operation to complete the calibration in the present embodiment (see FIG. 14), it may represent the number of times the input has been made, for example. Thus, the user can easily recognize the number of inputs in the calibration.

(3-4) Other Process Examples

Figure 16:
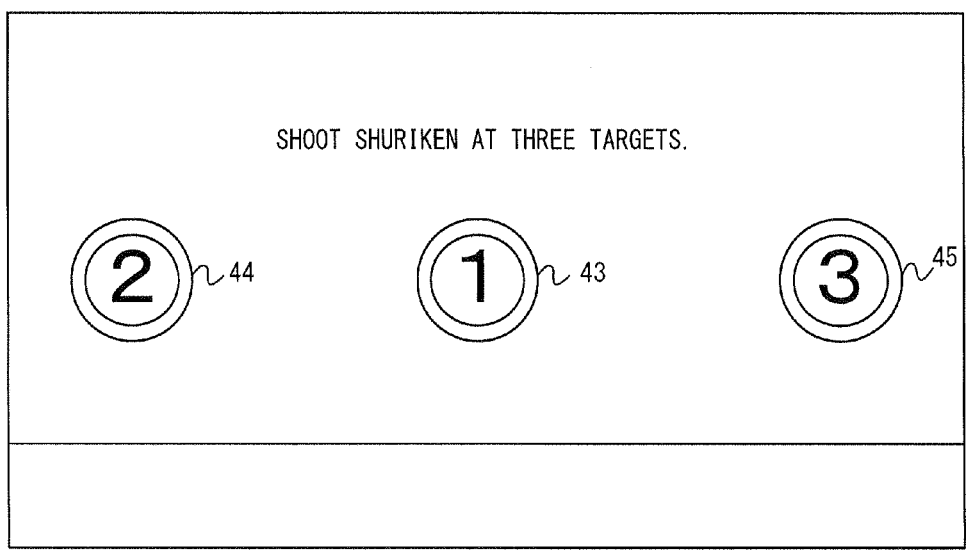
FIG. 16 is a diagram showing an example of an image displayed in a calibration process according to an alternative embodiment.

Note that in other embodiments, a plurality of targets may be displayed. FIG. 16 is a diagram showing an example of an image displayed in the calibration process in another embodiment. In FIG. 16, three targets 43 to 45 are displayed. A message "Shoot shuriken at three targets" is displayed on the television 4. In response to this, the user performs the predetermined game operation in a total of three iterations, each for one of the three targets 43 to 45.

Where a plurality of objects to be targets are displayed in the calibration process, the information processing system 1 executes a process, for each input, of associating the input (one of the first input and the additional inputs) with one of the plurality of objects. While the manner of association is not limited to any particular manner, the information processing system 1 may associate the objects with the inputs in a predetermined order, for example. In FIG. 16, the targets are associated with the first, second and third inputs in the order of the numbers on the targets, i.e., in the order of targets 43, 44 and 45. That is, the user launches shurikens aiming at the targets 43, 44 and 45 in this order.

Figure 17:
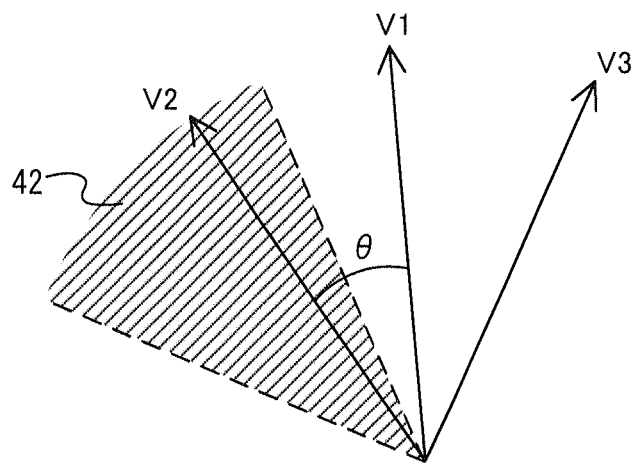
FIG. 17 is a diagram showing an example of attitudes corresponding to different inputs and a predetermined range according to the alternative embodiment.

In such a case, the predetermined range defined by the tentative reference attitude is a range that does not include the tentative reference attitude. FIG. 17 is a diagram showing an example of attitudes associated with different inputs and a predetermined range in another embodiment. In FIG.

17, the predetermined range 42 used for the second input is set so as to include an attitude associated with the target 44. Although not shown in FIG. 17, a predetermined range used for the third input is set so as to include an attitude associated with the target 45, as with the second input. Note that "an attitude associated with a target" is an attitude such that the launch direction is toward the target where the tentative reference attitude is used as the reference attitude.

Also in such a case, as in the embodiment above, the reference attitude is determined using at least one of the attitudes associated with the different inputs. For example, the attitude associated with the first input (the tentative reference attitude) may be used as the reference attitude, or an average between the different attitudes may be used as the reference attitude.

Where it is assumed that the attitude of the controller device 2 differs for each input as described above, the information processing system 1 can determine the amount of change in the launch direction with respect to the amount of change in the attitude of the controller device 2. For example, in FIG. 17, the amount of change in the launch direction for a transition from the attitude (the vector V1) associated with the first input to the attitude (the vector V2) associated with the second input may be determined as the amount of change from the direction toward the target 43 to the direction toward the target 44. For example, the amount of change in the launch direction can be calculated based on the amount of change (the angle θ) between two attitudes associated with two inputs and the distance between the two targets 43 and 44 associated with the two inputs.

Thus, in the alternative process example described above, the information processing system 1 determines the amount of change in the object action direction (the launch direction) for the amount of change in the attitude based on the difference between at least two of the tentative reference attitude and the attitudes associated with the plurality of additional inputs. Then, the game control process is executed based on the amount of change in the action direction. Thus, the rate of change in the action direction with respect to the change in the attitude of the controller device 2 can be determined by the calibration process. While an appropriate value for this rate varies depending on the screen size of the television 4, the distance from the television 4 to the user (the controller device 2), etc., the rate can be set to an appropriate value according to the alternative process example described above.

In the alternative process example described above, the information processing system 1 generates an image representing a virtual space including a plurality of objects (the targets 43 to 45), and when each input is accepted, the image is displayed on the display device (the television 4) different from the controller device 2. Then, the amount of change in the action direction is determined based on the amount of change between the two attitudes associated with any two of the inputs, and the distance between the two objects associated with the two inputs. Then, the user can set the amount of change in the action direction by performing the predetermined game operation while pointing the controller device 2 toward the objects.

(3-5) Game Control Process Using Reference Attitude

After the reference attitude is determined by the calibration process, the game control process is executed. In the present embodiment, a process of calculating the moving direction of an object (the launch direction of the shuriken 38) is executed, as the game control process, based on the attitude of the controller device 2 and the reference attitude. In the present embodiment, the launch direction of the shuriken 38 is calculated based on the relationship between the attitude of the controller device 2 at that point in time and the reference attitude. Specifically, where the attitude of the controller device 2 is the reference attitude, the launch direction is the predetermined reference direction. The predetermined reference direction is a predetermined direction in the virtual space (game space). In the present embodiment, the predetermined reference direction is a front direction in the virtual space, i.e., the direction from the launch position of the shuriken 38 toward the position of the target 41. Where the attitude of the controller device 2 is different from the reference attitude, the orientation of the launch direction with respect to the reference direction is determined in accordance with the change in orientation from the reference attitude to the attitude of the controller device 2. In this case, the amount of change from the reference direction to the launch direction is determined in accordance with the amount of change in attitude from the reference attitude to the attitude of the controller device 2. As described above, the user can change the direction in the virtual space (launch direction) through an operation of changing the attitude of the controller device 2.

As described above, in the game control process, the information processing system 1 calculates a direction corresponding to the display position of the target 41 which is displayed in the calibration process as the action direction of an object (the launch direction of the shuriken 38) if the attitude of the controller device 2 at a point in time when the predetermined game operation is performed is the reference attitude. Thus, the user can perform the calibration operation by performing the predetermined game operation in a plurality of iterations aiming at the target 41. Then, it is possible to precisely calculate the reference attitude because the user is made to make a plurality of inputs while the controller device 2 is directed toward one direction.

Note that the action direction of the object calculated in the game control process may be calculated based on the attitude of the controller device 2 and the reference attitude. For example, in other embodiments, the action direction may be calculated so as to reflect the direction of the trace drawn by the slide operation performed on the touch panel 12, in addition to the attitude of the controller device 2 and the reference attitude.

4. Specific Process Example of Present Embodiment

Figure 18:
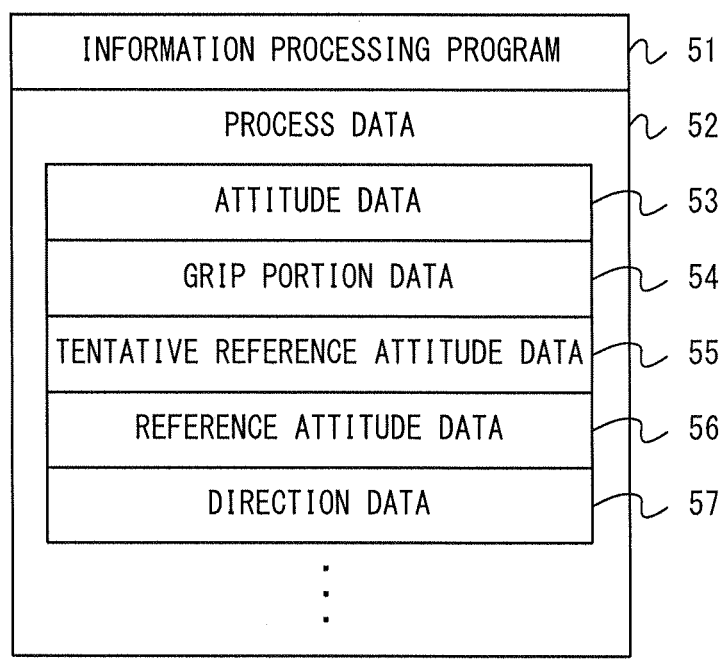
FIG. 18 is a diagram showing an example of data stored in a memory 6 of a game device 3 according to the present embodiment.

Referring to FIGS. 18 to 22, specific processes and operations of the information processing system 1 according to the present embodiment will now be described. FIG. 18 is a diagram showing an example of data stored in the memory 6 of the game device 3 in the present embodiment. As shown in FIG. 18, the memory 6 of the game device 3 stores an information processing program 51 and process data 52. Note that in addition to the data shown in FIG. 18, the memory 6 may store operation data obtained from the controller device 2, images to be output to different display devices, image data used for producing those images, etc.

The information processing program 51 is a program to be executed by the computer (the CPU 5) of the game device 3. Note that the information processing program 51 is stored in a program storing unit (a storage device or a storage medium) that is provided inside or outside the game device 3 and accessible from the game device 3. A part or whole of the information processing program 51 stored in the program storing unit is loaded to the memory 6 at an appropriate point in time and executed by the CPU 5. A part or whole of the information processing program 51 may be pre-stored (e.g., as a library) in the information processing apparatus executing the information processing program 51.

The process data 52 is data used in the information process (the game process shown in FIG. 8) executed y the CPU 5. The process data 52 includes attitude data 53, grip portion data 54, tentative reference attitude data 55, reference attitude data 56, and direction data 57.

The attitude data 53 is data representing the attitude of the controller device 2. The attitude data 53 may be a one-dimensional value for the rotation about a predetermined axis, or a value of two dimensions or more for the rotation about two or more axes.

The grip portion data 54 is data representing the determination result of the orientation determination process. That is, the grip portion data 54 is data representing the orientation of the grip portion 13, and may be flag data representing whether the grip portion 13 is facing right or facing left, for example.

The tentative reference attitude data 55 is data representing the tentative reference attitude. The reference attitude data 56 is data representing the reference attitude. As with the attitude data, each of these data may be a one-dimensional value for the rotation about a predetermined axis, or a value of two dimensions or more for the rotation about two or more axes.

The direction data 57 is data representing a direction in the virtual space (herein, the launch direction of the shuriken 38) calculated based on the attitude of the controller device 2.

Figure 19:
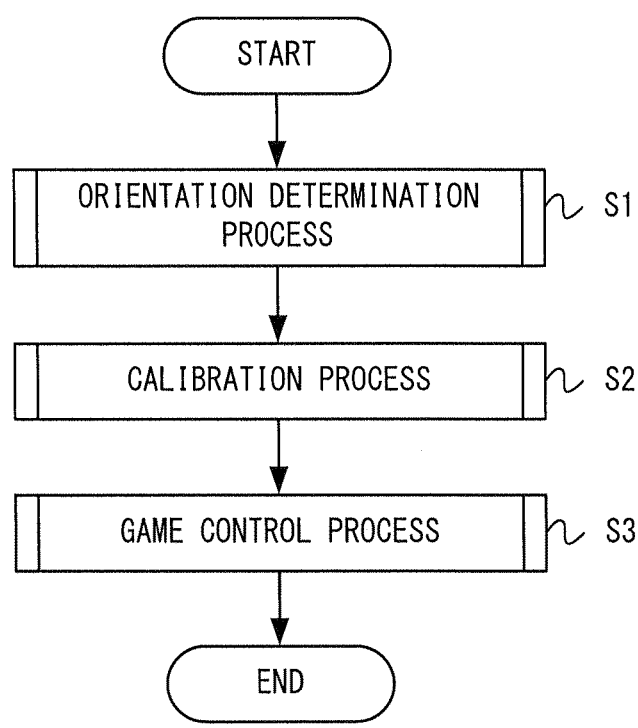
FIG. 19 is a flow chart showing an example of a flow of a process executed by a CPU 5 of a game device according to the present embodiment.

FIG. 19 is a flow chart showing an example of the flow of the process executed by the CPU 5 of the game device in the present embodiment. For example, the CPU 5 initializes storage units such as the memory 6, and loads an information processing program (game program) 40 from the program storing unit to the memory 6. Then, the CPU 5 starts execution of the information processing program 51. The flow chart of FIG. 19 is a flow chart showing processes to be executed after completion of the processes described above.

Note that the process in each step in the flow chart of FIG. 19 is merely an example, and the order of steps may be changed or any of the steps may be replaced with another process, as long as similar results are obtained. While processes of the steps of the flow chart are executed by the CPU 5 in the present embodiment, one or more steps of the flow chart may be executed by a processor or a dedicated circuit other than the CPU 5.

Figure 20:
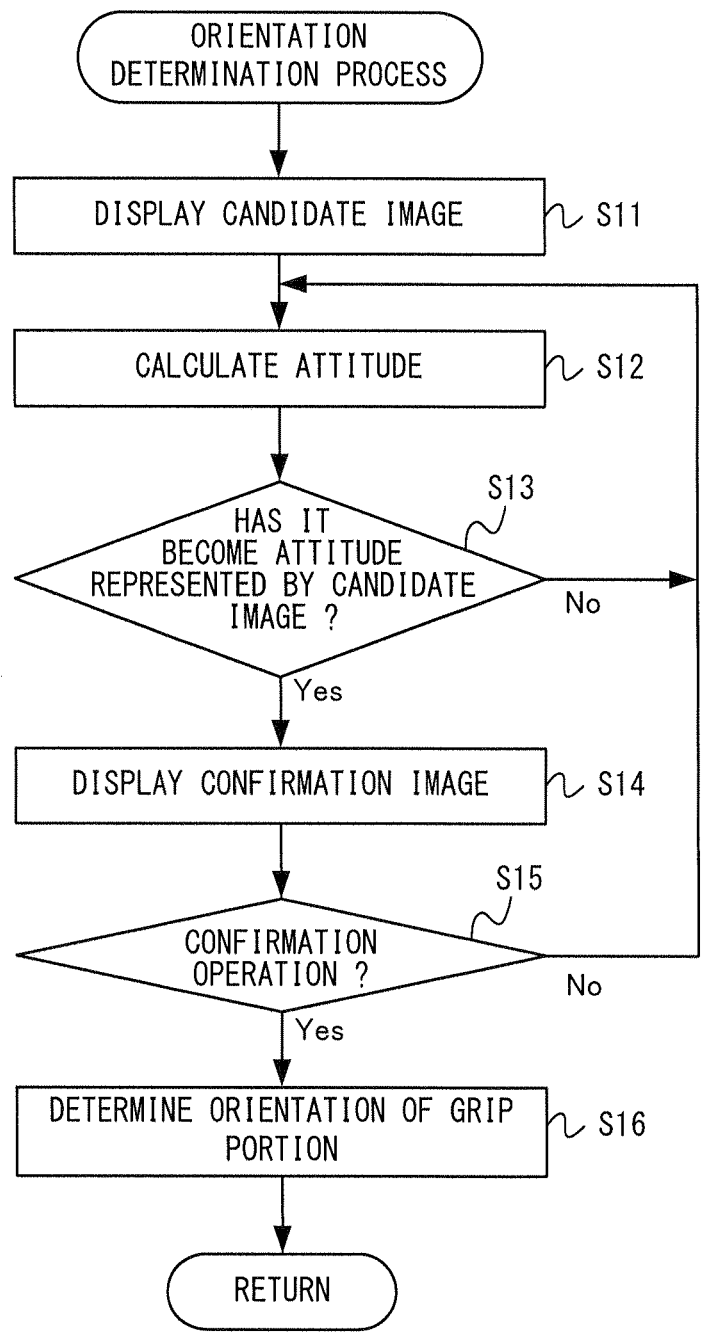
FIG. 20 is a flow chart showing an example of a detailed flow of an orientation determination process (step S1) shown in FIG. 19.

First, in step S1, the CPU 5 executes the orientation determination process described above. FIG. 20 is a flow chart showing an example of a detailed flow of the orientation determination process (step S1) shown in FIG. 19. In step S11, the CPU 5 displays the candidate image. The CPU 5 generates the candidate image 31 described above in "(2-3) Displaying candidate image", and displays the candidate image 31 on the controller device 2 and the television 4.

In step S12, the CPU 5 calculates the attitude of the controller device 2. The attitude of the controller device 2 is calculated by a method described above in "(2-6) Attitude calculation method". More specifically, the CPU 5 obtains operation data from the controller device 2, and calculates the attitude based on the acceleration data included in the operation data. As the attitude of the controller device 2, a vector representing the direction of gravity calculated from the acceleration data may be calculated, for example. The CPU 5 stores data representing the calculated attitude, as the attitude data 53, in the memory 6.

In step S13, the CPU 5 determines whether the attitude of the controller device 2 has become any one of the attitudes represented by the candidate image 31. In the present embodiment, it is determined whether the attitude calculated in step S12 has become either an attitude such that the grip portion 13 is facing left with the controller device 2 being upright or an attitude such that the grip portion 13 is facing right with the controller device 2 being upright. While the specific method of determination may be any method, it may be determined based on whether a vector representing the direction of gravity has become closer, than a predetermined reference, to the x axis which is set with respect to the controller device 2. Specifically, the CPU 5 reads out the attitude data 53 from the memory 6, and makes the determination using the attitude represented by the attitude data 53. If the determination result of step S13 is affirmative, the process of step S14 is executed. On the other hand, if the determination result of step S13 is negative, the process of step S12 is executed again. That is, the processes of steps S12 and S13 are executed repeatedly until the attitude of the controller device 2 becomes the attitude represented by the candidate image 31.

In step S14, the CPU 5 displays the confirmation image 32. The CPU 5 generates the confirmation image 32 described above in "(2-4) Confirmation process", and displays the confirmation image 32 on the television 4. In the present embodiment, an image including the confirmation button 36 described above in "(2-4) Confirmation process" is displayed on the controller device 2.

In step S15, the CPU 5 determines whether the confirmation operation has been done by the user. That is, the CPU 5 obtains operation data from the controller device 2, and determines whether the confirmation operation has been done based on the touch position data included in the operation data (data representing the position input on the touch panel 12). If the determination result of step S15 is affirmative, the process of step S16 is executed. On the other hand, if the determination result of step S15 is negative, the process of step S12 is executed again. That is, the processes of steps S12 to S15 are executed repeatedly until the confirmation operation is done.

In step S16, the CPU 5 determines the orientation of the grip portion 13. That is, the CPU 5 determines the orientation of the grip portion 13 by the method described above in "(2-5) Orientation determination". Then, data representing the determination result is stored in the memory 6 as the grip portion data 54. After step S16, the orientation determination process ends.

Figure 21:
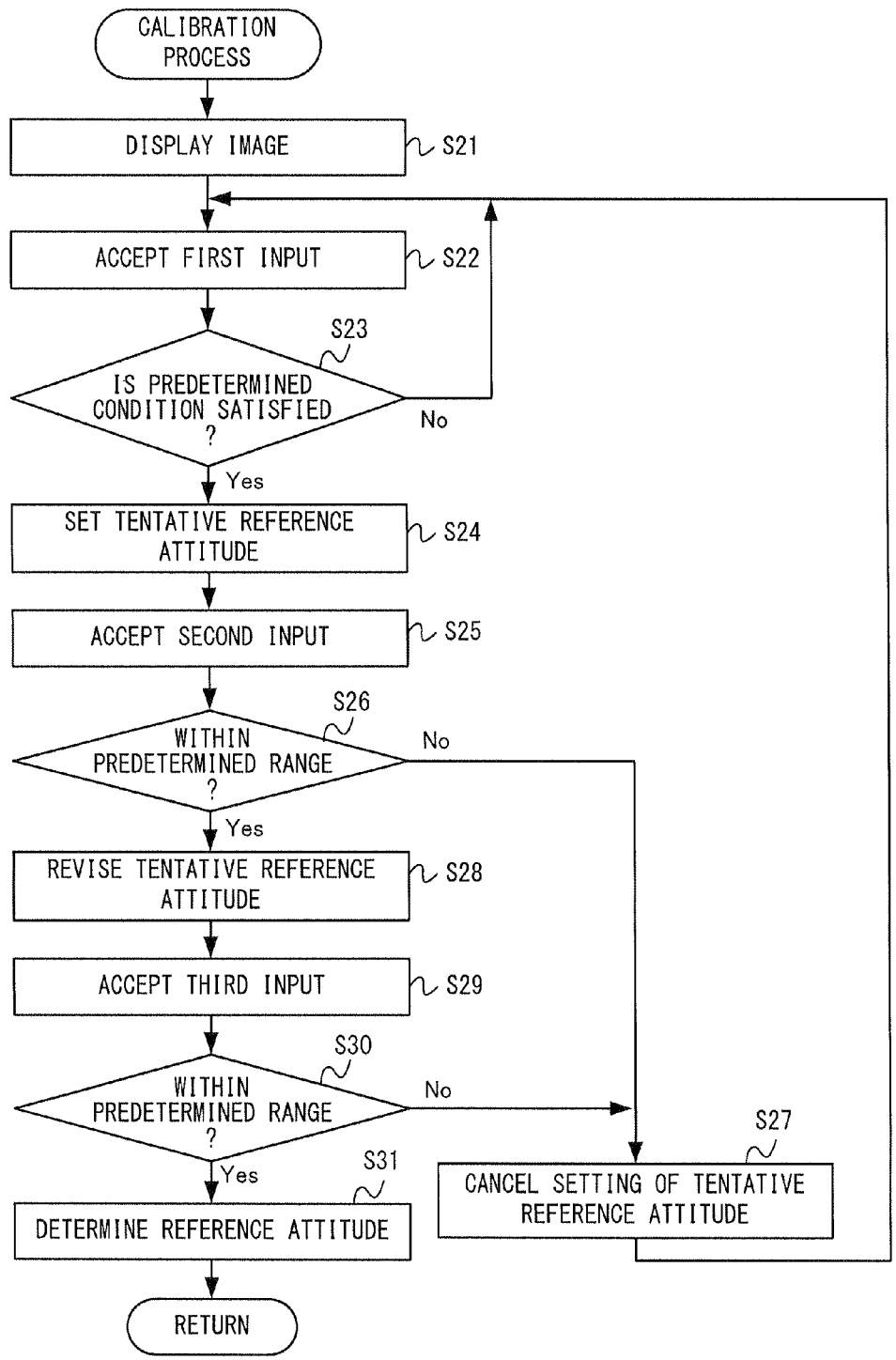
FIG. 21 is a flow chart showing an example of a detailed flow of a calibration process (step S2) shown in FIG. 19.

Following the orientation determination process (step S1), the process of step S2 is executed. In step S2, the CPU 5 executes the calibration process. FIG. 21 is a flow chart showing an example detailed flow of the calibration process (step S2) shown in FIG. 19.

In the calibration process, first, in step S21, the CPU 5 displays an image on display devices (the LCD 11 of the controller device 2 and the television 4). That is, the CPU 5 generates the image to be displayed on the television 4 and outputs the generated image to the television 4, and generates the image to be displayed on the LCD 11 and outputs the generated image to the controller device 2. Note that the image to be displayed on the television 4 is an image of the virtual space including the target 41, and the image to be displayed on the controller device 2 is an image of the shuriken 38 (see FIG. 5). Although not shown in the flow chart of FIG. 21, images displayed on the display devices are displayed while being updated once per a predetermined time period.

In step S22, the CPU 5 accepts the first input. That is, the CPU 5 successively obtains the operation data from the controller device 2, and determines whether the predetermined game operation has been performed based on the touch position data included in the operation data. In this process, the CPU 5 makes the determination while reversing the up-down direction (x-axis direction) of the touch panel 12 depending on the determination result as described above in "(2-7) Information process based on determination result". That is, the CPU 5 reads out the grip portion data 54 from the memory 6, and makes the determination while reversing the up-down direction of the touch panel 12 depending on the content of the grip portion data 54.

In step S22, the CPU 5 waits until it is determined that the predetermined game operation has been performed, and calculates the attitude of the controller device 2 when it is determined that the predetermined game operation has been performed. While the attitude may be calculated in any manner, it is calculated based on the detection result of the acceleration sensor 23 and/or the gyrosensor 24 in the present embodiment. The CPU 5 stores data representing the calculated attitude in the memory 6 as attitude data.

In step S23, the CPU 5 determines whether the first input satisfies a predetermined condition. That is, the CPU 5 determines whether the condition described above in "(First input)" is satisfied. If the determination result of step S23 is affirmative, the process of step S24 is executed. If the determination result of step S23 is negative, the process of step S22 is executed.

In step S24, the CPU 5 sets the tentative reference attitude. That is, the CPU 5 stores the content of the attitude data in the memory 6 as the tentative reference attitude data.

In step S25, the CPU 5 accepts the second input as an additional input. The process of step S25 is similar to step S22. Thus, data representing the attitude of the controller device 2 at a point in time when the second input is made is stored in the memory 6 as attitude data.

In step S26, the CPU 5 determines whether an attitude associated with the second input is within a predetermined range. That is, the determination is made by the method described above in "(Condition for additional inputs)". If the determination result of step S26 is affirmative, the process of step S28 to be described later is executed. If the determination result of step S26 is negative, the process of step S27 is executed.

In step S27, the CPU 5 cancels the setting of the tentative reference attitude. That is, the CPU 5 deletes the tentative reference attitude data stored in the memory 6. After step S27, the process of step S22 is executed again.

In step S28, the CPU 5 updates (revises) the tentative reference attitude. The tentative reference attitude is revised by the method described above in "(Second input)". The CPU 5 stores data representing the revised tentative reference attitude in the memory 6 as the tentative reference attitude data.

In step S29, the CPU 5 accepts the third input as an additional input. The process of step S29 is similar to step S22. Thus, data representing the attitude of the controller device 2 at a point in time when the third input is made is stored in the memory 6 as attitude data.

In step S30, the CPU 5 determines whether an attitude associated with the third input is within a predetermined range. That is, as in step S26 described above, the determination is made by the method described above in "(Condition for additional inputs)". If the determination result of step S30 is affirmative, the process of step S31 is executed. If the determination result of step S30 is negative, the process of step S27 is executed.

In step S31, the CPU 5 determines the reference attitude. The reference attitude is calculated by the method described above in "(Third input)". The CPU 5 stores data representing the calculated reference attitude in the memory 6 as reference attitude data.

Note that while it is not shown in the flow chart of FIG. 21, the CPU 5 controls the action of launching the shuriken 38 in response to acceptance of each input. This control is performed by the method described above in "(3-3) Control in calibration process". Note that the method for calculating the launch direction of the shuriken 38 is similar to the process of step S42 to be described later.

Figure 22:
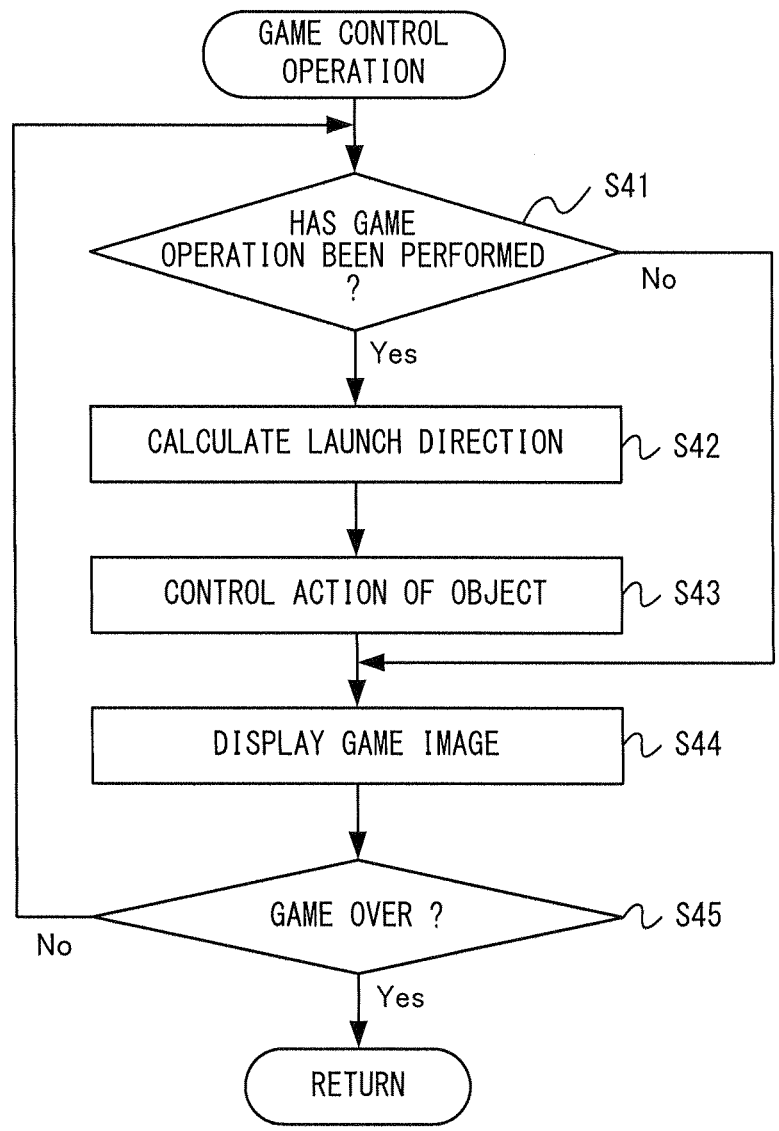
FIG. 22 is a flow chart showing an example of a detailed flow of a game control process (step S3) shown in FIG. 19.

The process of step S3 is executed, following the calibration process (step S2). In step S3, the CPU 5 executes the game control process described above. FIG. 22 is a flow chart showing an example of a detailed flow of a game control process (step S3) shown in FIG. 19.

In the game control process, first, in step S41, the CPU 5 determines whether the predetermined game operation has been performed. As in step S22, this determination is made based on the touch position data included in the operation data obtained from the controller device 2. If the determination result of step S41 is affirmative, the process of step S42 is executed. If the determination result of step S41 is negative, the process of step S44 is executed, skipping the processes of steps S42 and S43.

In step S42, the CPU 5 calculates a direction in the virtual space (launch direction) based on the attitude of the controller device 2. Specifically, first, the attitude of the controller device 2 is calculated by a method similar to step S22 described above. Then, the launch direction is calculated based on the calculated attitude by the method described above in "(2-7) Information process based on determination result" and "(3-5) Game control process using reference attitude". That is, the CPU 5 reads out the grip portion data 54 from the memory 6, and calculates the launch direction so that the orientation of change of the launch direction in response to the attitude change of the controller device 2 is reversed, depending on the content of the grip portion data 54, with respect to the pitch direction and/or the roll direction. The CPU 5 stores data representing the calculated launch direction in the memory 6 as the direction data.

As described above, in the present embodiment, different information processes are executed in steps S41 and S42 depending on the determination result of the orientation determination.

In step S43, the CPU 5 controls the action of the object (the shuriken 38). That is, a control of moving the shuriken 38 in the launch direction is executed. In step S44 to follow, the CPU 5 generates a game image to be displayed on the controller device 2 and the television 4, and outputs the game image to the controller device 2 and the television 4.

In step S45, the CPU 5 determines whether the game should be ended. If the determination result of step S45 is negative, the process of step S41 is executed again. On the other hand, if the determination result of step S45 is affirmative, the CPU 5 ends the game process shown in FIG. 19. Thereafter, the series of processes of steps S41 to S45 is executed repeatedly until it is determined in step S45 that the game should be ended. This has been the description of the game process shown in FIG. 18.

5. Variations

In other embodiments, the information processing system 1 may execute only one of the orientation determination process and the calibration process. That is, the information processing system 1 may execute only the orientation determination process with the aim of determining the orientation of the grip portion 13 of the controller device 2, or may execute only the calibration process with the aim of determining the reference attitude of the controller device 2.

In the embodiment above, the information processing system 1 executes an information process of which the content varies depending on the determination result of the orientation determination. In other embodiments, the determination result of the orientation determination may be used in any manner. For example, in other embodiments, where a correct (recommended) way of holding the controller device 2 is defined, the information processing system may determine if the current way of holding the controller device 2 is the correct way based on the determination result so as to give a warning to the user if it is not the correct way, while giving no warning if it is the correct way.

Note that in other embodiments, the orientation determination process and/or the calibration process may be used in an information process other than the game process. The orientation determination process and the calibration process may be applied to any information process executed based on an input made on a controller device.

The embodiment above is directed to an example case where the controller device 2 elongated in the horizontal direction is used in a portrait position. In other embodiments, the orientation determination process and/or the calibration process may be applicable also to cases where the controller device 2 is held in other ways of holding. That is, irrespective of the attitude of the controller device 2 in use, the information processing system 1 can determine the orientation of the grip portion 13 using the orientation determination process and set the reference attitude using the calibration process.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable to, for example, an information processing system (game system), an information processing program (game program), etc., with the aim of more precisely determining the mode in which the user is holding the controller device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including a controller device, wherein:
   the controller device comprises:
      a housing; and
      a grip portion formed lopsided with respect to a center of a predetermined surface of the housing and protruding from the predetermined surface of the housing,
   the information processing system being configured to provide processing comprising:
      an attitude calculation for calculating an attitude of the controller device so that at least a first attitude in which the grip portion is located in a first direction with respect to the center and a second attitude in which the grip portion is located in a second direction substantially opposite to said first direction with respect to the center can be distinguished from each other; and
      a determination for determining, via a computer processor of the information processing system, an orientation of the grip portion with respect to the center based on the attitude of the controller device.

2. The information processing system according to claim 1, wherein
   the information processing system is configured to provide further processing comprising a process execution for executing an information process after the determination, wherein the information process is an information process based on an input made on the controller device, and the content of the information process varies depending on a determination result of the determination.

3. The information processing system according to claim 2, wherein
   the information processing system is configured to provide further processing comprising an output for outputting, before the execution of the information process, an image showing how to hold the controller device when the information process is executed.

4. The information processing system according to claim 2, wherein
   the information processing system is configured to provide further processing comprising an output for outputting an image simultaneously representing a plurality of states with different orientations of the grip portion, wherein the determination includes selecting an orientation of the grip portion from among the plurality of states.

5. The information processing system according to claim 3, wherein
the output includes output of an image representing the controller device as seen from a direction generally perpendicular to the predetermined surface.

6. The information processing system according to claim 3, wherein
the information processing system is configured to provide further processing comprising a judgment for judging, where the image is output, whether the controller device has assumed a predetermined attitude represented by the image and/or sound,
wherein the determination includes determination of the orientation of the grip portion when the controller device has assumed the predetermined attitude.

7. The information processing system according to claim 2, the controller device further comprising a position detector for detecting a position at which an input has been made on a predetermined input surface provided on the housing, wherein
the information process is executed using at least the position detected by the position detector as an input.

8. The information processing system according to claim 2, wherein
the information process is executed using at least the attitude of the controller device as an input.

9. The information processing system according to claim 8, wherein:
the grip portion is formed lopsided with respect to a left-right direction of the predetermined surface;
the determination includes determination of whether the grip portion is facing left or facing right with respect to the center; and
the process execution includes execution of, as the information process, a process of changing a direction in a virtual space according to an attitude change of the controller device, wherein the change in the direction in the virtual space is reversed depending on the determination result with respect to an attitude change about an axis extending in the left-right direction and/or an attitude change about an axis extending in an up-down direction parallel to the predetermined plane and perpendicular to the left-right direction.

10. The information processing system according to claim 1, the controller device further comprising an acceleration sensor, wherein
the attitude calculation includes calculation of an attitude of the controller device with respect to a direction of gravity based on a detection result of the acceleration sensor.

11. A determination method for determining an orientation of a controller device including a housing and a grip portion formed lopsided with respect to a center of a predetermined surface of the housing and protruding from the predetermined surface of the housing, the method comprising:
calculating an attitude of the controller device so that at least a first attitude in which the grip portion is located in a first direction with respect to the center and a second attitude in which the grip portion is located in a second direction substantially opposite to said first direction with respect to the center can be distinguished from each other; and
determining, via a computer processor of a game system including the controller device, the orientation of the grip portion with respect to the center based on the attitude of the controller device.

12. An information processing apparatus comprising:
a housing;
a grip portion formed lopsided with respect to a center of a predetermined surface of the housing and protruding from the predetermined surface of the housing;
an attitude calculator configured to calculate an attitude of the information processing apparatus so that at least a first attitude in which the grip portion is located in a first direction with respect to the center and a second attitude in which the grip portion is located in a second direction substantially opposite to said first direction with respect to the center can be distinguished from each other; and
a determination device configured to determine, via a computer processor of the information processing apparatus, an orientation of the grip portion with respect to the center based on the attitude.

13. An information processing apparatus capable of communicating with a controller device, wherein:
the controller device comprises:
a housing; and
a grip portion formed lopsided with respect to a center of a predetermined surface of the housing and protruding from the predetermined surface of the housing, the information processing apparatus comprising a computer processor, the information processing apparatus being configured to at least:
calculate an attitude of the controller device so that at least a first attitude in which the grip portion is located in a first direction with respect to the center and a second attitude in which the grip portion is located in a second direction substantially opposite to said first direction with respect to the center can be distinguished from each other; and
determine, via a computer processor of the information processing apparatus, an orientation of the grip portion with respect to the center based on the attitude of the controller device.

14. A non-transitory computer-readable storage medium storing thereon an information processing program to be executed by a computer of an information processing apparatus including a housing, and a grip portion formed lopsided with respect to a center of a predetermined surface of the housing and protruding from the predetermined surface of the housing, the information processing program causing the computer to execute:
calculating an attitude of the information processing apparatus so that at least a first attitude in which the grip portion is located in a first direction with respect to the center and a second attitude in which the grip portion is located in a second direction substantially opposite to said first direction with respect to the center can be distinguished from each other; and
determining, via the computer of the information processing apparatus, an orientation of the grip portion with respect to the center based on the attitude.

15. A non-transitory computer-readable storage medium storing thereon an information processing program to be executed by a computer of an information processing apparatus capable of communicating with a controller device including a housing, and a grip portion formed lopsided with respect to a center of a predetermined surface of the housing and protruding from the predetermined surface of the housing, the information processing program causing the computer to execute:

calculating an attitude of the controller device so that at least a first attitude in which the grip portion is located in a first direction with respect to the center and a second attitude in which the grip portion is located in a second direction substantially opposite to said first direction with respect to the center can be distinguished from each other; and determining, via the computer of the information processing apparatus, an orientation of the grip portion with respect to the center based on the attitude of the controller device.

16. The information processing system of claim 1, wherein
  the predetermined surface, from which the grip portion protrudes, is that surface of the housing that is opposite to a surface of the housing having a display.

17. The method of claim 11, wherein
  the predetermined surface, from which the grip portion protrudes, is that surface of the housing that is opposite to a surface of the housing having a display.

18. The information processing apparatus claim 12, wherein
  the predetermined surface, from which the grip portion protrudes, is that surface of the housing that is opposite to a surface of the housing having a display.

19. The information processing apparatus claim 13, wherein
  the predetermined surface, from which the grip portion protrudes, is that surface of the housing that is opposite to a surface of the housing having a display.

20. The storage medium of claim 14, wherein
  the predetermined surface, from which the grip portion protrudes, is that surface of the housing that is opposite to a surface of the housing having a display.

21. The storage medium of claim 15, wherein
  the predetermined surface, from which the grip portion protrudes, is that surface of the housing that is opposite to a surface of the housing having a display.

* * * * *